US012634433B2

(12) United States Patent
Liu et al.

(10) Patent No.: US 12,634,433 B2
(45) Date of Patent: May 19, 2026

(54) SYSTEMS AND METHODS FOR HYBRID MACHINE LEARNING AND DCT-BASED VIDEO COMPRESSION

(71) Applicant: Portland State University, Portland, OR (US)

(72) Inventors: Feng Liu, Beaverton, OR (US); Wu-Chi Feng, Tigard, OR (US)

(73) Assignee: PORTLAND STATE UNIVERSITY, Portland, OR (US)

( * ) Notice: Subject to any disclaimer, the term of this patent is extended or adjusted under 35 U.S.C. 154(b) by 26 days.

(21) Appl. No.: 18/250,949

(22) PCT Filed: Nov. 8, 2021

(86) PCT No.: PCT/US2021/072288
§ 371 (c)(1),
(2) Date: Apr. 27, 2023

(87) PCT Pub. No.: WO2022/099313
PCT Pub. Date: May 12, 2022

(65) Prior Publication Data
US 2023/0412796 A1     Dec. 21, 2023

Related U.S. Application Data

(60) Provisional application No. 63/111,514, filed on Nov. 9, 2020.

(51) Int. Cl.
*H04N 19/105* (2014.01)
*H04N 19/154* (2014.01)
(Continued)

(52) U.S. Cl.
CPC ......... *H04N 19/105* (2014.11); *H04N 19/154* (2014.11); *H04N 19/172* (2014.11); *H04N 19/85* (2014.11)

(58) Field of Classification Search
CPC .. H04N 19/105; H04N 19/154; H04N 19/172; H04N 19/85; H04N 19/625;
(Continued)

(56) References Cited

U.S. PATENT DOCUMENTS 10,445,921 B1 * 10/2019 Li ......................... H04N 19/51
10,701,394 B1   6/2020 Caballero et al.
(Continued)

FOREIGN PATENT DOCUMENTS

JP       2004048627 A     2/2004
WO       2018199051 A1    11/2018
(Continued)

OTHER PUBLICATIONS

ISA United States Patent and Trademark Office, International Search Report and Written Opinion Issued in Application No. PCT/US2021/072288, Jan. 31, 2022, WIPO, 7 pages.
(Continued)

*Primary Examiner* — Tracy Y. Li
(74) *Attorney, Agent, or Firm* — McCoy Russell LLP

(57) ABSTRACT

Systems and methods for hybrid video compression. A method includes receiving an encoded video including at least two compressed frames corresponding to at least two anchor frames and a compressed subset of at least one intermediate frame between the at least two anchor frames, generating, by inputting the at least two anchor frames into a deep machine learning model, a synthesized image frame corresponding to the at least one intermediate frame between the at least two anchor frames, reconstructing at least one hybrid image frame by combining the compressed subset of the at least one intermediate frame with the synthesized image frame, and outputting a video including the at least two anchor frames and the at least one hybrid image frame. Thus, DCT-based video compression techniques can lever- (Continued)

age machine learning-based video interpolation techniques to provide encoded video streams with a reduced bitrate and thus reduced bandwidth while maintaining image quality.

10 Claims, 15 Drawing Sheets

(51) Int. Cl.
  *H04N 19/172*        (2014.01)
  *H04N 19/85*         (2014.01)
(58) Field of Classification Search
  CPC .......... H04N 19/88; G06N 3/045; G06N 3/08;
          G06N 3/0475; G06N 3/088; G06N 3/094;
                G06T 5/50; G06T 9/002; G06T
                                2207/20084
  See application file for complete search history.

(56)                References Cited

U.S. PATENT DOCUMENTS

| | | | | |
|---|---|---|---|---|
| 10,848,734 B1 * | 11/2020 | Waggoner | ............ | H04N 19/167 |
| 2019/0289257 A1 | 9/2019 | Schroers et al. | | |
| 2020/0280730 A1 | 9/2020 | Wang et al. | | |
| 2020/0327702 A1 | 10/2020 | Wang et al. | | |
| 2020/0342234 A1 * | 10/2020 | Gan | ......................... | G06V 20/46 |
| 2021/0280191 A1 * | 9/2021 | Geng | ....................... | G10L 15/22 |
| 2021/0342686 A1 * | 11/2021 | Kothari | .................... | G06N 3/08 |
| 2022/0273139 A1 * | 9/2022 | Mahapatra | ......... | G05B 13/0265 |
| 2022/0301563 A1 * | 9/2022 | Chang | ..................... | G10L 15/24 |
| 2022/0303555 A1 | 9/2022 | Lu et al. | | |
| 2023/0276070 A1 * | 8/2023 | Yang | .................... | H04N 19/188 |
| | | | | 375/240.03 |

FOREIGN PATENT DOCUMENTS

| | | |
|---|---|---|
| WO | 2019168765 A1 | 9/2019 |
| WO | 2020150264 A1 | 7/2020 |

OTHER PUBLICATIONS

Japanese Patent Office, Office Action Issued in Application No. 2025-528092, Aug. 14, 2025, 7 pages.

Wu, C. et al., "Video Compression through Image Interpolation," ArXiv Cornell University Website, Available Online at https://arxiv.org/abs/1804.06919, Apr. 18, 2018, 18 pages.

Japan Patent Office, Office Action Issued in Application No. 2023-528092, Mar. 24, 2026, 10 pages. (Submitted with English Translation).

\* cited by examiner

1000

1010

1020

1030

1040

SYSTEMS AND METHODS FOR HYBRID MACHINE LEARNING AND DCT-BASED VIDEO COMPRESSION

CROSS-REFERENCE TO RELATED APPLICATIONS

The present application claims priority to U.S. Provisional Application No. 63/111,514, entitled "SYSTEMS AND METHODS FOR HYBRID MACHINE LEARNING AND DCT-BASED VIDEO COMPRESSION", and filed on Nov. 9, 2020. The entire contents of the above-listed application are hereby incorporated by reference for all purposes.

FIELD

The disclosure relates to video compression. Specifically, compressing video using a hybrid machine learning and discrete cosine transform (DCT)-based approach.

BACKGROUND

Digital video compression formats have continued to evolve. In particular, the International Telecommunications Union (ITU) and the International Standards Organization (ISO) have developed distinct video codecs, including H.261, MPEG-1, H.263, MPEG-2, H.264, MPEG-4, and H.265/HEVC. All of the video compression and decompression (codec) formats share two common themes: they use the discrete cosine transform (DCT) and employ motion compensation to more effectively encode similarities that exist in the video, particularly between adjacent frames. Each iteration of MPEG video has added successively more types of search options to reduce the amount of residual information that needs to be included in the compressed bitstream. As video compression standards have continued to develop, the amount of computing power to achieve the next standard has comparatively increased. For example, the latest HEVC/H.265 standard uses approximately ten times the computing power compared to the last-generation H.264 codec. There is therefore an unmet need for alternative compression techniques.

SUMMARY

As video compression standards continue to develop, it appears that the increasing compression achievable with DCT-based techniques is reaching a limit. Meanwhile, recent developments in image and video synthesis have introduced and improved the ability to reconstruct obstructed areas or interpolate video frames at a higher frame rate. For example, video frame interpolation enables frames to be synthesized in between two existing video frames. As discussed further herein below, various systems and methods are provided that leverage video frame synthesis to further improve video compression. In particular, a video encoder can send a sparse set of video frames, and the decoder can reconstruct the frames that were omitted by directly synthesizing them.

In one embodiment, a method includes receiving an encoded video comprising at least two compressed frames corresponding to at least two anchor frames and a compressed subset of at least one intermediate frame between the at least two anchor frames. The method further includes generating a synthesized image frame corresponding to the at least one intermediate frame between the at least two anchor frames by inputting the at least two anchor frames into a deep machine learning model. The method then reconstructs at least one hybrid image frame by combining the compressed subset of the at least one intermediate frame with the synthesized image frame, and outputs a video comprising the at least two anchor frames and the at least one hybrid image frame. In this way, DCT-based video compression techniques can leverage machine learning-based video interpolation techniques to provide encoded video streams with a reduced bitrate and thus reduced bandwidth while maintaining image quality.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
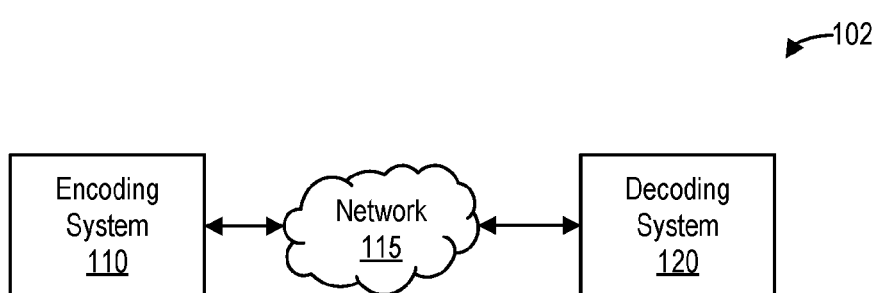
FIG. 1 is block diagram illustrating an example system for encoding and decoding video according to an embodiment.
Figure 3:
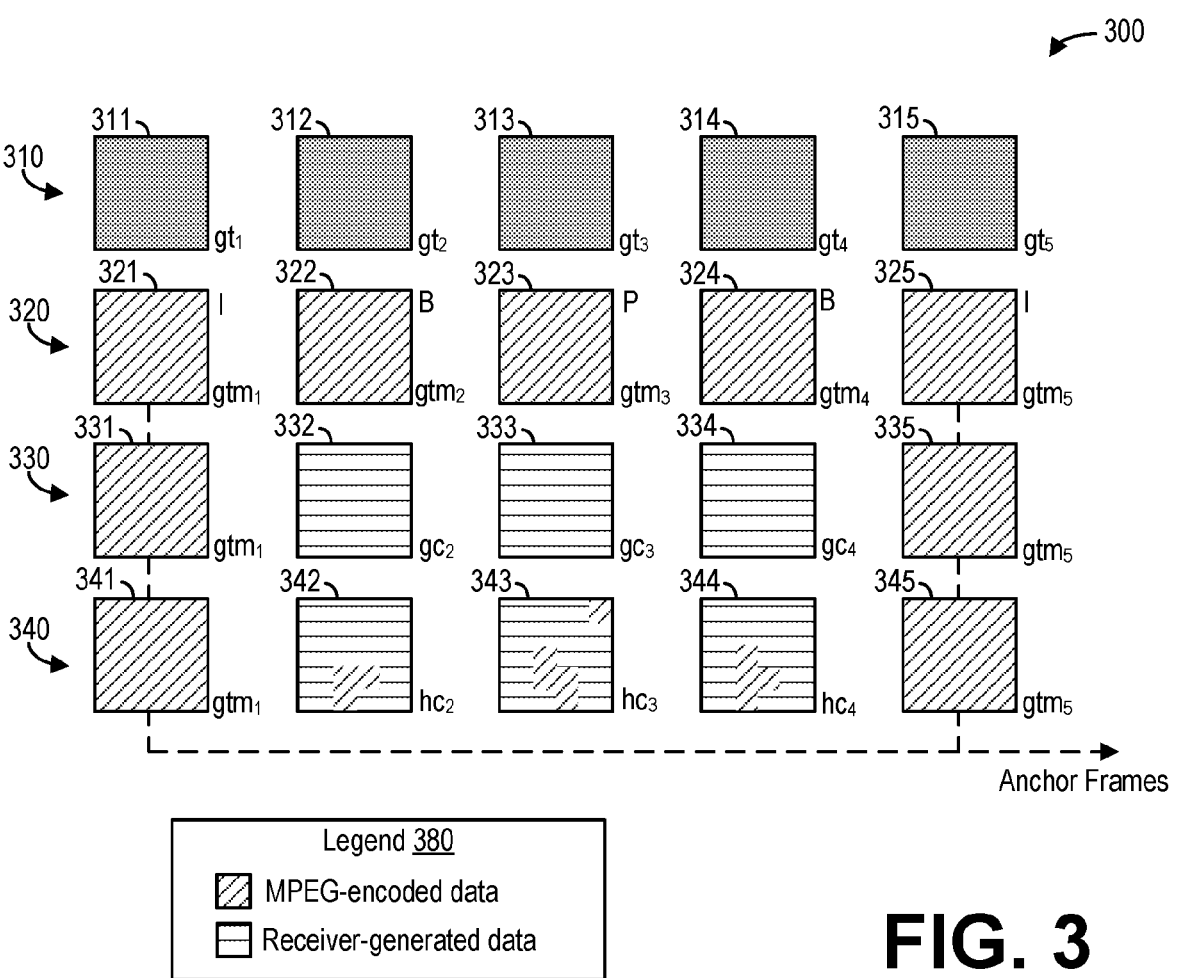
FIG. 3 is a block diagram illustrating an example hybrid video compression architecture according to an embodiment.
Figure 4:
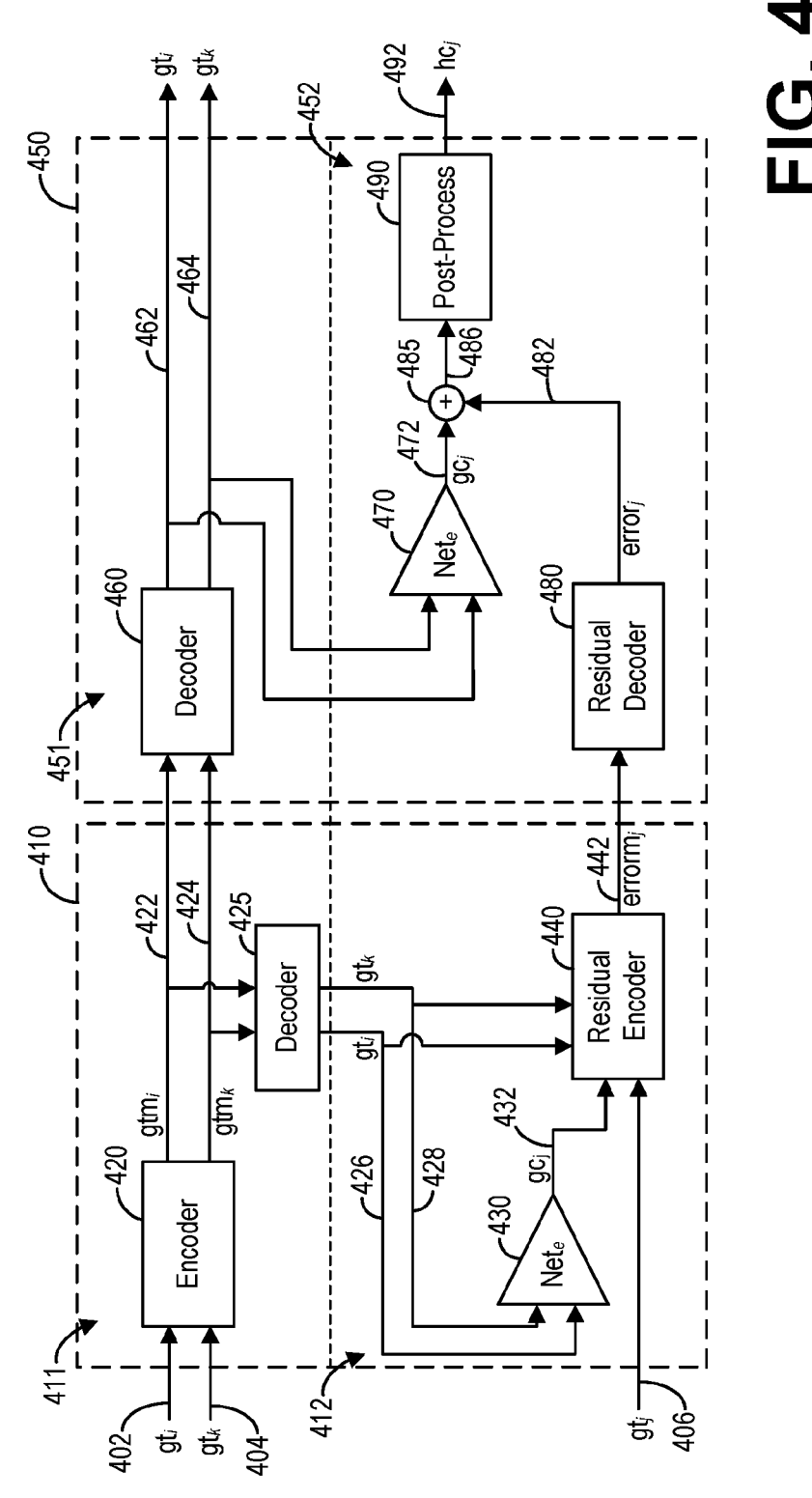
FIG. 4 is a block diagram illustrating an example method for hybrid video compression according to an embodiment.
Figure 10:
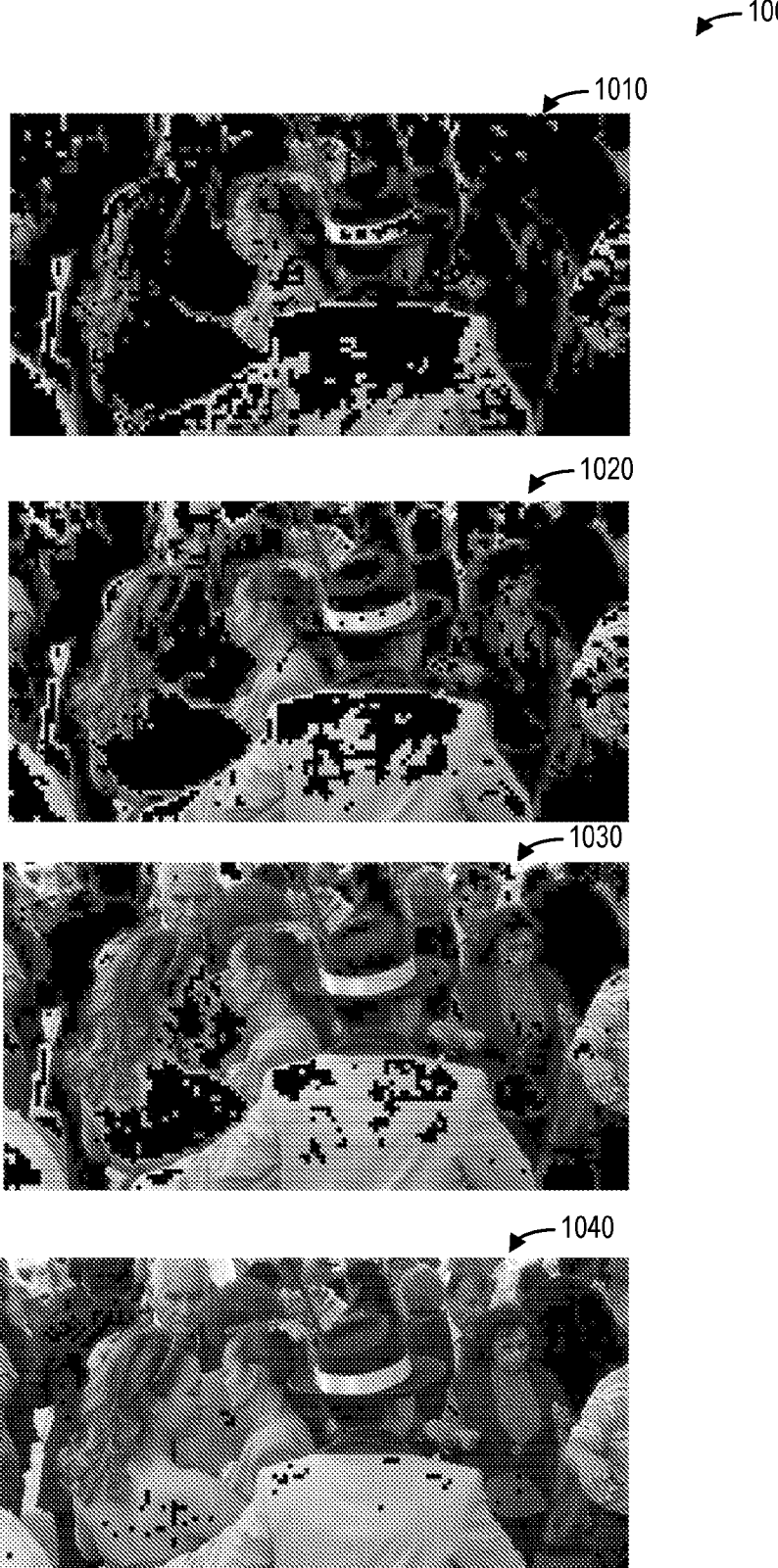
FIG. 10 is a set of images illustrating the effect of different peak signal-to-noise ratio thresholds on detecting macroblocks in the first video sequence for replacement according to an embodiment.
Figure 11:
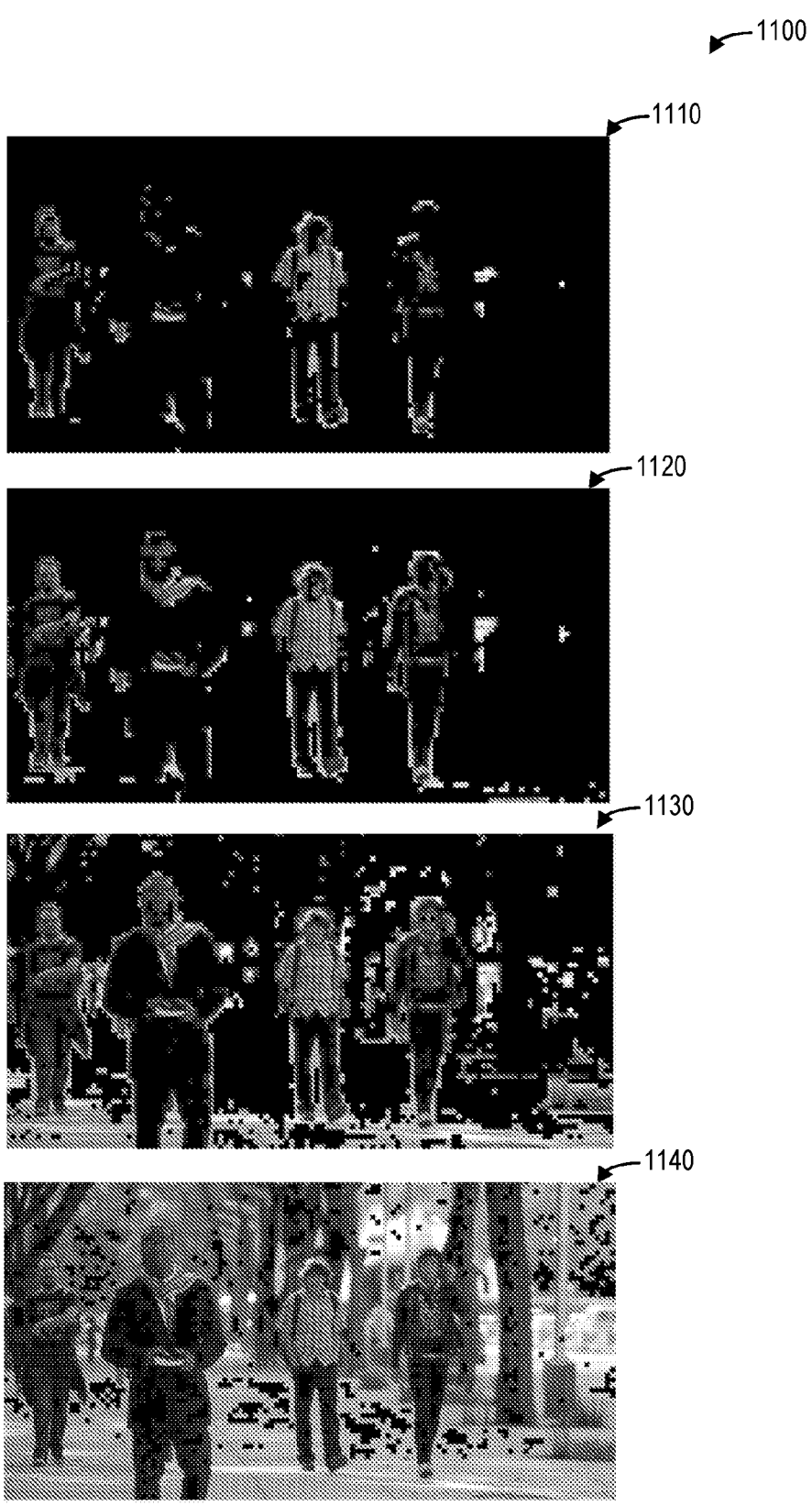
FIG. 11 is a set of graphs illustrating the effect of different anchor-frame distances on video quality and bitrate for the first video sequence according to an embodiment.
Figure 12:
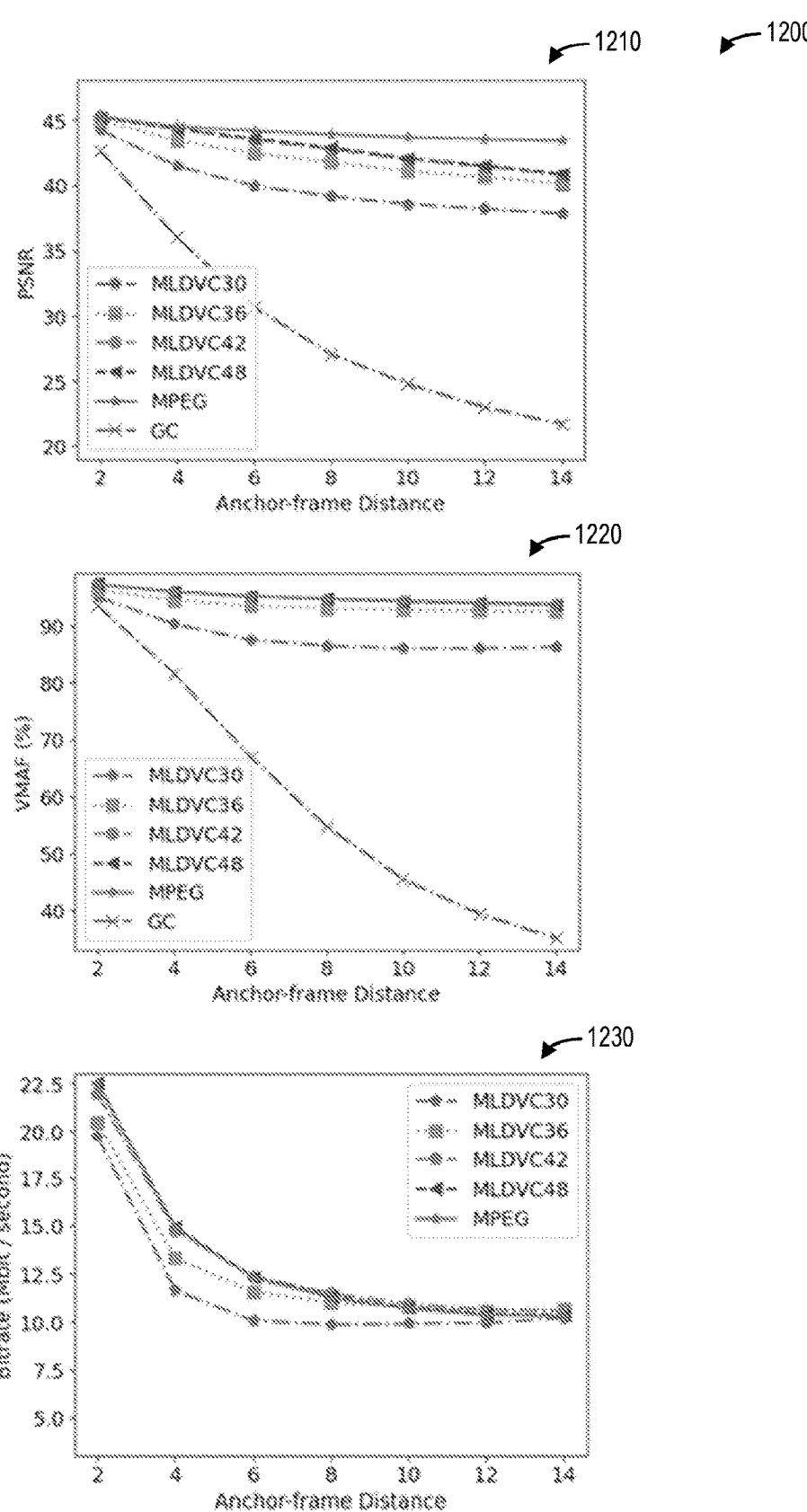
FIG. 12 is a set of images illustrating the effect of different peak signal-to-noise ratio thresholds on detecting macroblocks in the second video sequence for replacement according to an embodiment.
Figure 13:
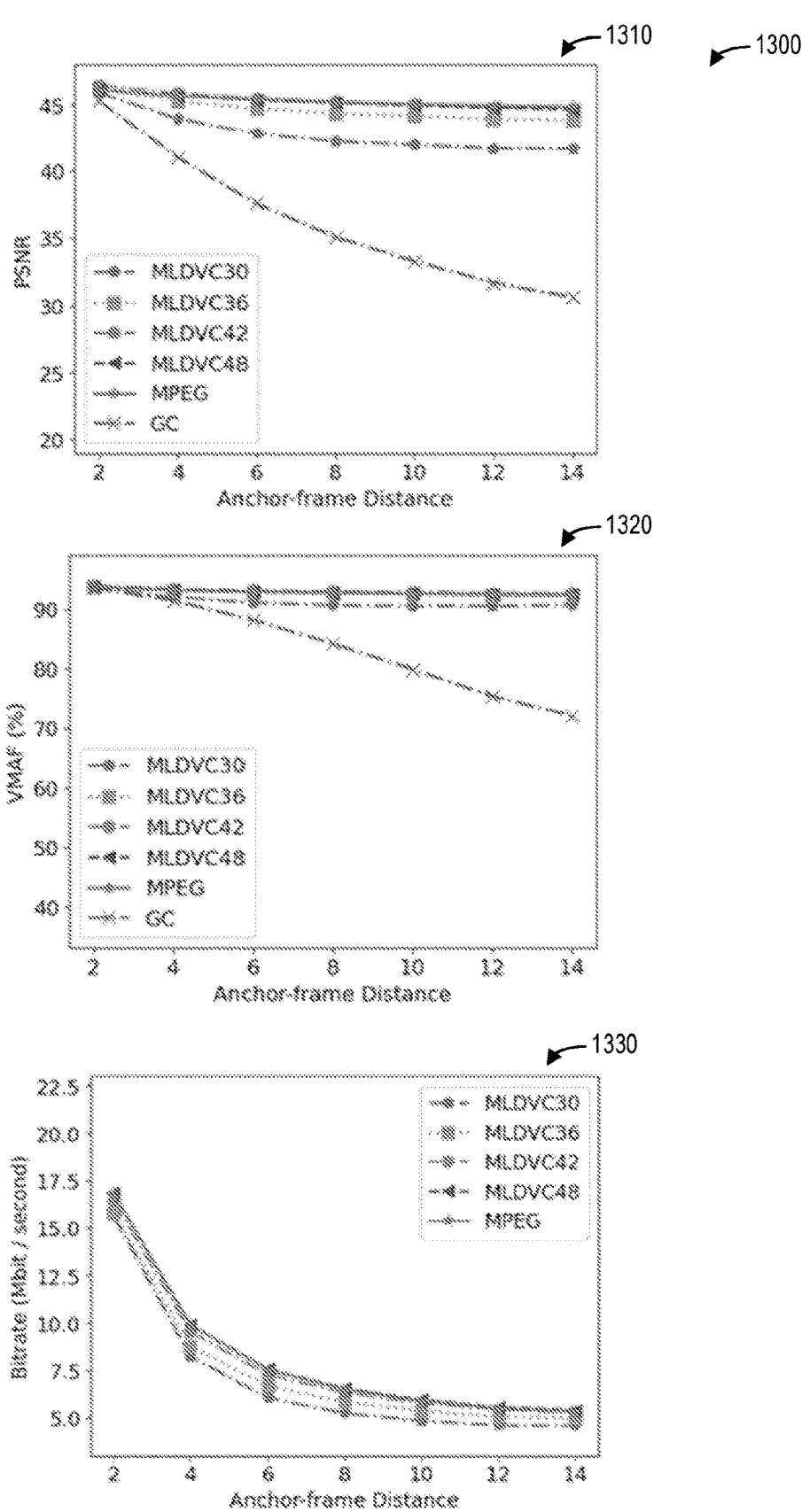
FIG. 13 is a set of graphs illustrating the effect of different anchor-frame distances on video quality and bitrate for the second video sequence according to an embodiment.
Figure 14:
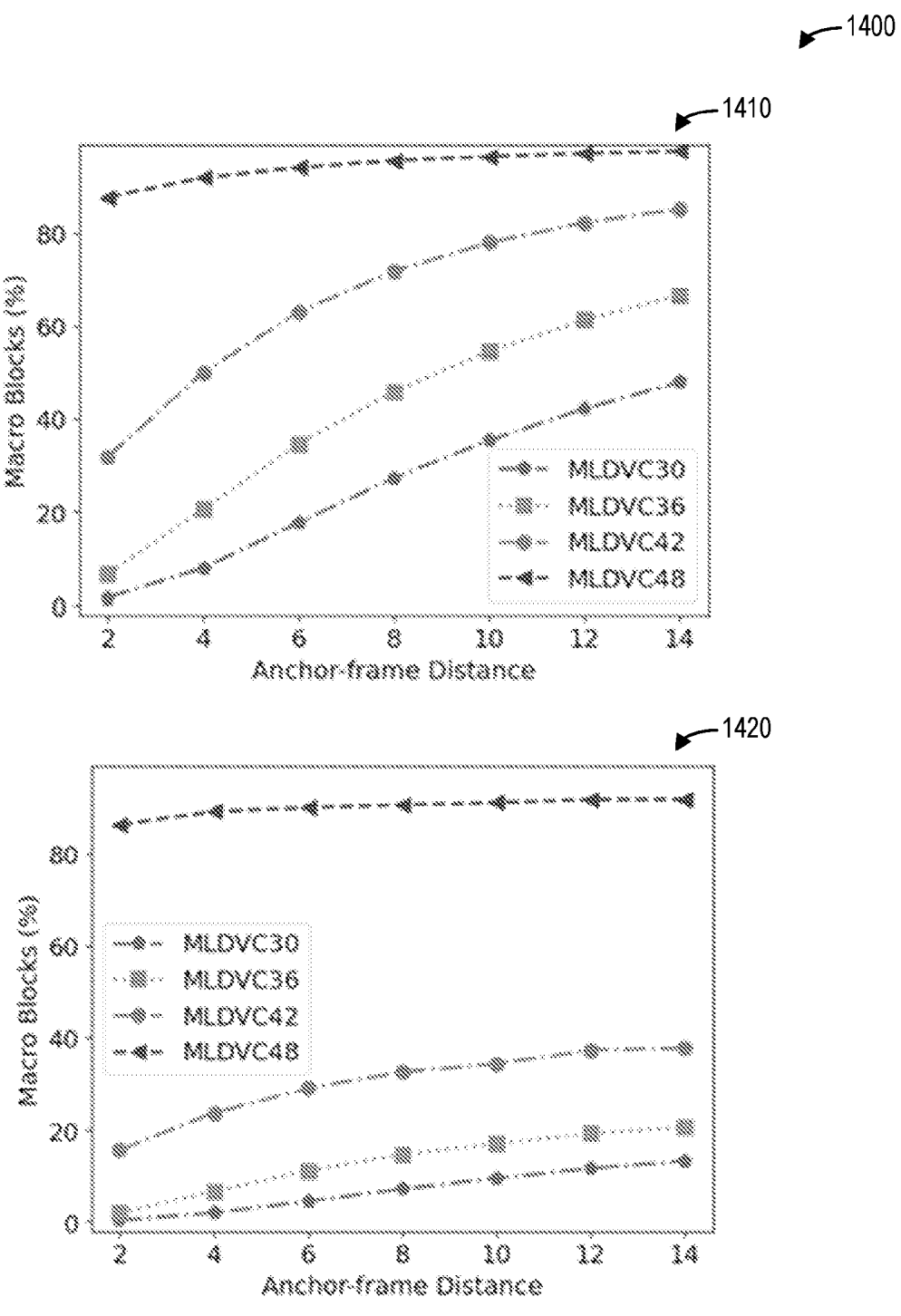
FIG. 14 is a set of graphs illustrating the effect of different anchor-frame distances on the number of macroblock changes in the first and second video sequences according to an embodiment.
Figure 15:
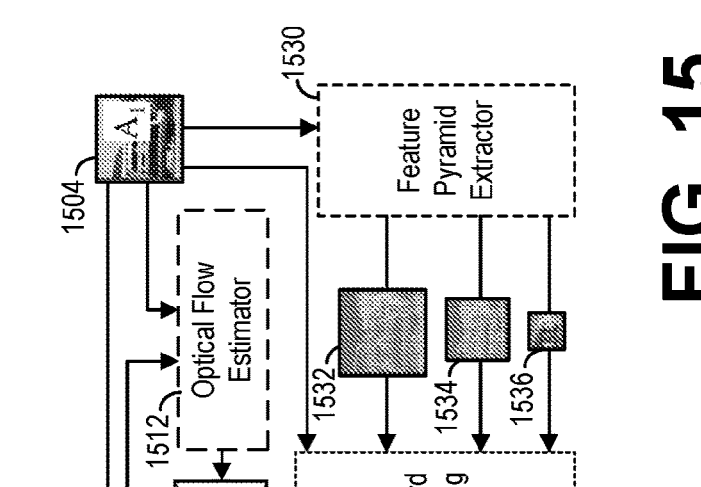
FIG. 15 is a block diagram illustrating an example multi-scale video frame synthesis neural network according to an embodiment, and FIG. 16A and B are enlarged versions of the images in the block diagram of FIG. 15.
Figure 16A:
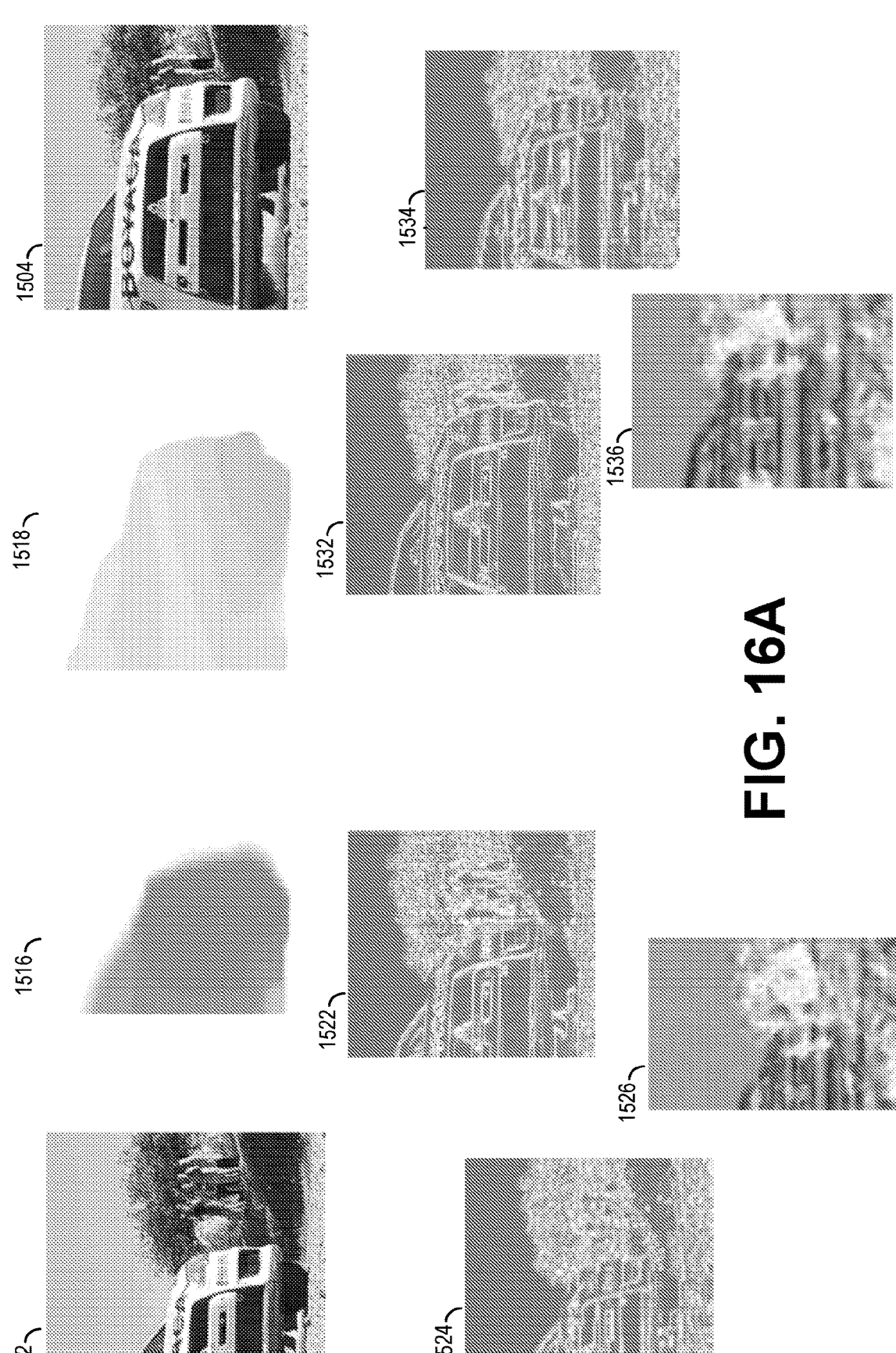
Figure 16B:
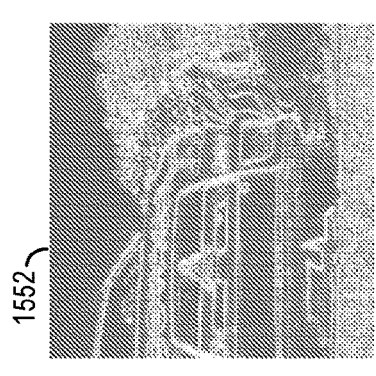
Figure 16B:
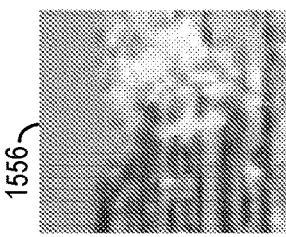
Figure 16B:
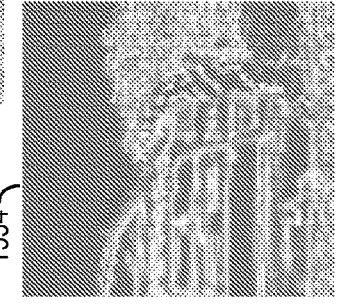
Figure 16B:
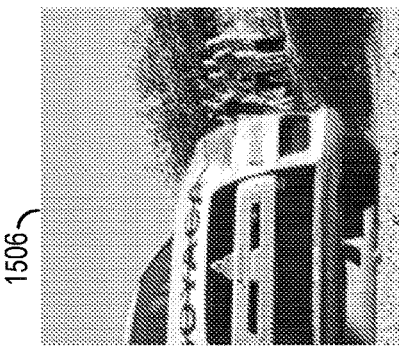
Figure 16B:
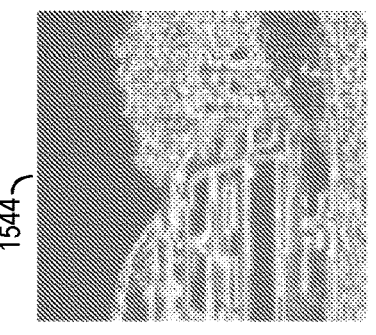
Figure 16B:
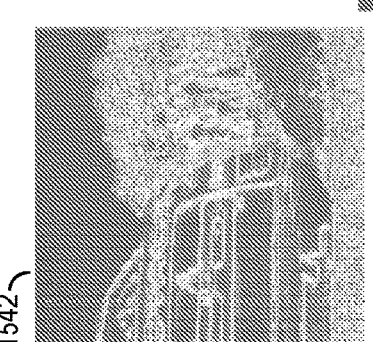
Figure 16B:
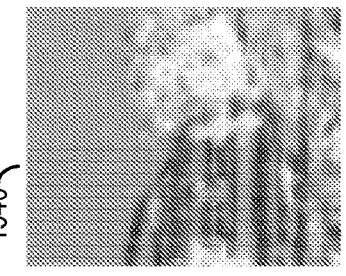

The following description relates to various embodiments of hybrid video compression. In particular, a hybrid machine learning and DCT-based video compression approach, hereinafter referred to as the hybrid compression approach or simply as hybrid compression, is provided that combines traditional video coding with advanced machine learning-based frame interpolation to perform video compression. For example, as depicted in FIG. 1, a system configured with the hybrid compression approach leverages DCT-based video compression, such as MPEG-4, to encode a series of key frames or anchor frames at a compression or encoding system, and then synthesizes the missing video frames using the anchor frames on the decompression or decoding system via video frame interpolation techniques. The encoding and decoding systems may comprise a single computing system or separate computing systems, such as the computing device depicted in FIG. 2. In contrast with pure video compression or simply interpolating entire frames in between anchor frames, the hybrid compression technique as shown in FIG. 3 results in hybrid frames formed from both encoded data generated at the encoding system and synthesized data generated at the decoding system. For example, as depicted in FIG. 4, the hybrid compression approach includes selectively sending residual information to improve areas that the image synthesizer has difficulty generating due to complex motion or occlusions. A method for generating an encoded video stream, such as the method depicted in FIG. 5, thus includes using a deep machine learning model configured to synthesize intermediate frames in order to identify residual information. Meanwhile, a method for decoding the encoding video stream, such as the method depicted in FIG. 6, uses the same deep machine learning model to synthesize the intermediate frames, which are then corrected using the residual information identified by the encoder. The hybrid compression approach produces substantial qualitative improvements to compressing video with non-linear motion, even with an increased temporal distance between anchor frames, as illustrated by the example videos in FIG. 7, the non-hybrid interpolated videos in FIG. 8 corresponding to the videos of FIG. 7, and the hybrid compression videos in FIG. 9 corresponding to the videos of FIG. 7. As depicted in FIGS. 10 and 11, an image quality threshold may be selected to balance the amount of residual information to be encoded versus the amount of image data to be synthesized. Both the anchor-frame distance and the image quality threshold may be tuned to obtain desired reductions in bitrate and thus bandwidth, as depicted in FIGS. 12-14. Finally, a multi-scale video frame synthesis network, such as the network depicted in FIG. 15, enables a plurality of intermediate frames to be synthesized while accounting for the underlying geometry in synthesized scenes. Enlarged versions of the images from FIG. 15 are shown in FIGS. 16A and B.

Turning now to the figures, FIG. 1 is block diagram illustrating an example system 102 for encoding and decoding video according to an embodiment. In particular, a video may be encoded by the encoding system 110 and the encoded video may in turn be decoded by the decoding system 120. The encoding system 110 and the decoding system 120 are configured to encode and decode video according to a hybrid video compression technique that uses both residual coding techniques of DCT-based video compression and machine learning-based video frame interpolation to reduce the amount of visual data to be compressed, as described further herein.

The encoding system 110 and the decoding system 120 may be communicatively coupled via a network 115, such that the encoded video may be transmitted from the encoding system 110 to the decoding system 120 via the network 115. The network 115 may comprise the Internet or one or more public, private, or hybrid wired or wireless networks, including, but not limited to, an Internet Protocol (IP)-based local area network (LAN), metropolitan area network (MAN), a wide area network (WAN), a system-area network (SAN), a wireless LAN (WLAN) network such as Wireless Fidelity (WiFi), and/or a cellular communications network such as a Global System for Mobile Communications (GSM) network, an Evolution-Data Optimized (EV-DO) network, a 3G network, a 4G long term evolution (LTE) network, a 5G network, and so on.

The encoding system 110 and the decoding system 120 may both comprise separate computing devices, such as the computing device 205 described herein below. In other examples, the processing of one or more of the encoding system 110 and/or the decoding system 120 may be distributed across multiple devices, such as multiple computing devices. In yet other examples, the encoding system 110 and the decoding system 120 may comprise a same computing device 205 or computing system. In such examples, the system 102 may omit the network 115 or the network 115 may comprise an internal data bus or storage media, for example.

In some examples, the video encoded by the encoding system 110 may be streamed, effectively in real-time, as the encoding of the video occurs, to the decoding system 120 via the network 115. In other examples, a video may be encoded and then stored in computer readable memory for transmission to the decoding system 120 at a later time. In yet other examples, the decoding system 120 may receive the encoded video from the encoding system 110, store the encoded video in memory, and decode the encoded video at a later time. In yet other examples, the system 102 may include an intermediate system (not shown), such as a central server for example, that receives the encoded video stream from the encoding system 110 via the network 115 and distributes the encoded video stream to one or more decoding systems 120 via the network 115.

Figure 2:
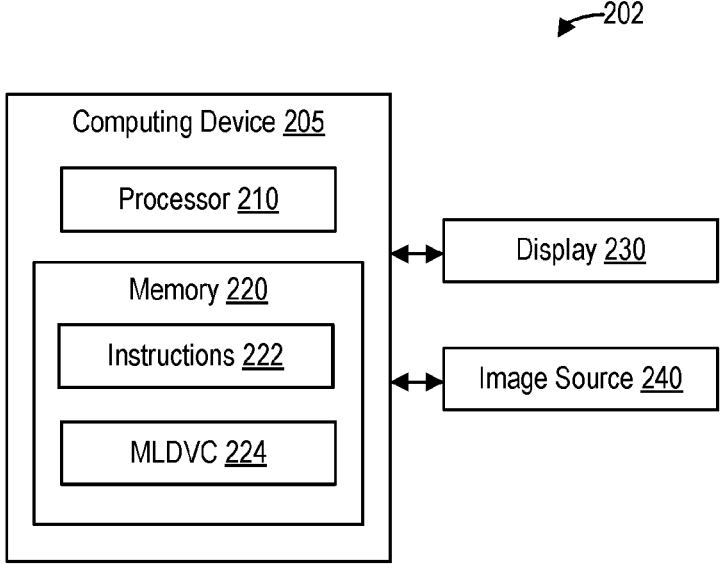
FIG. 2 is a block diagram illustrating an example computing device for hybrid video compression according to an embodiment.

FIG. 2 is a block diagram illustrating an example computing system 202 comprising a computing device 205 for hybrid video compression according to an embodiment. The computing device 205 may comprise the encoding system 110 and/or the decoding system 120. The computing device 205 may comprise a computing system including multiple computing devices, or may comprise a single computing device, including, but not limited to, a mobile phone, a tablet computer, a laptop computer, a notebook computer, a desktop computer, a home entertainment computer, a network computing device, a gaming device, a server computer, a mobile communication device, and so on.

The computing device 205 comprises a logic subsystem such as a processor 210 and a data-holding subsystem such as a memory 220. The computing system 202 further comprises a display device 230 communicatively coupled to the computing device 205. The display device 230 may be integrated into the computing device 205 in some examples. In some examples, the computing system 202 may optionally include an image source 240, such as a camera, for acquiring video. The image source 240 may be remote to the computing device 205 and communicatively coupled to the computing device 205 and configured to provide input video to the computing device 205 for hybrid compression of the input video as described herein. In other examples, the image source 240 may be integrated into the computing device 205. The computing device 205 may optionally include a communication subsystem, a user interface subsystem, and other components not shown in FIG. 1. The processor 210 comprises one or more virtual and/or physical devices configured to execute one or more instructions. For example, the processor 210 may execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor 210 may thus include one or more processors configured to execute software instructions. Additionally or alternatively, the processor 210 may comprise one or more hardware or firmware logic machines configured to execute hardware or firmware instructions. As illustrative and non-limiting examples, the processor 210 may comprise one or more central processing units (CPU), graphics processing units (GPUs), field-programmable gate arrays (FPGAs), application-specific integrated circuits (ASICs), other hardware configured for encoding and decoding, and so on. The processor 210 may be single or multi-core, and the programs executed thereon may be configured for parallel or distributed processing. The processor 210 may optionally including individual components that are distributed throughout two or more devices, which may be remotely located and/or configured for coordinated processing. Such devices may be connected via the network 115.

The memory 220 of the computing device 205 may comprise one or more physical, non-transitory devices configured to hold data and/or instructions executable by the processor 210 to implement the methods and processes described herein. When such methods and processes are implemented, the state of the memory 220 may be transformed (for example, to hold different data).

In one example, the memory 220 stores executable instructions 222 that when executed by the processor 210 cause the processor 210 to perform a sequence of actions. For example, as described further herein with regard to FIGS. 5 and 6, the executable instructions 222 may implement methods for encoding and/or decoding image frames of a video according to a hybrid DCT-machine learning approach. To that end, the memory 220 stores a machine learning and DCT-based video compression (MLDVC) module 224 configured to encode and/or decode image frames of a video. As described further herein with regard to FIG. 4, the MLDVC module 224 may comprise at least a deep machine learning model (such as a neural network or a generative adversarial network (GAN)), an encoder, and a decoder.

The memory 220 may also include removable media and/or built-in devices. The memory 220 may include optical memory (for example, CD, DVD, HD-DVD, Blu-Ray Disc, and so on), and/or magnetic memory devices (for example, hard drive disk, floppy disk drive, tape drive, MRAM, and so on), and the like. The memory 220 may include devices with one or more of the following characteristics: volatile, non-volatile, dynamic, static, read/write, read-only, random access, sequential access, location addressable, file addressable, and content addressable. In some embodiments, the processor 210 and the memory 220 may be integrated into one or more common devices, such as an application-specific integrated circuit or a system on a chip.

The computing device 205 may further comprise a display device 230. As illustrative and non-limiting examples, the display device 230 may display a video that has been encoded and decoded as described herein. The display device 230 may include one or more display devices utilizing virtually any type of display technology such as, but not limited to, cathode ray tube (CRT), liquid crystal display (LCD), light-emitting diode (LED), organic LED (OLED), electroluminescent display (ELD), active-matrix OLED (AMOLED), quantum dot (QD) displays, and so on. As another example, the display device 230 may comprise a display projector device such as a digital light processing (DLP) projector, a liquid-crystal-on-silicon (LCoS) projector, a laser projector, an LED projector, and so on. As yet another example, the display device 230 may comprise an augmented reality (AR) display system, a virtual reality (VR) display system, or a mixed reality (MR) display system.

The video or image source 240 may comprise any suitable source of video. For example, in some examples, the video source 240 may comprise a video camera configured to acquire video and/or a computing device storing a video in non-transitory memory. As mentioned hereinabove, a video comprises a sequence of image frames configured with a given frame rate. For example, the frame rate may range from six frames per second to 120 frames per second, as illustrative and non-limiting examples, depending on the type of video source 240 as well as the acquisition of the image frames.

FIG. 3 is a block diagram illustrating an example method 300 for hybrid video compression according to an embodiment. A video sequence comprises a plurality of image frames, or ground truth frames 310 ranging from a first ground truth frame $gt_1$ to an Nth ground truth frame $gt_N$, where N is the number of frames in the video. As depicted, the plurality of ground truth frames 310 includes a first ground truth frame 311 (e.g., frame $gt_1$), a second ground truth frame 312 (e.g., frame $gt_2$), a third ground truth frame 313 (e.g., frame $gt_3$), a fourth ground truth frame 314 (e.g., frame $gt_4$), and a fifth ground truth frame 315 (e.g., frame $gt_5$).

A traditional MPEG-based video codec compresses these ground truth frames 310 into a corresponding sequence of compressed image frames 320 ranging from a first compressed frame $gtm_1$ to an Nth compressed frame $gtm_N$. As depicted, the plurality of compressed image frames 320 includes a first compressed frame 321 (e.g., frame $gtm_1$), a second compressed frame 322 (e.g., frame $gtm_2$), a third compressed frame 323 (e.g., frame $gtm_3$), a fourth compressed frame 324 (e.g., frame $gtm_4$), and a fifth compressed frame 325 (e.g., frame $gtm_5$). As mentioned hereinabove, the basic underlying mechanism for image and video compression methods is the discrete cosine transform (DCT), which transforms small blocks of image data from the spatial domain to the frequency domain. For example, an image frame is broken into macroblocks, which in turn may be broken into smaller blocks on which the DCT is performed, resulting in substantial compression of image data while maintaining excellent visual quality. Using DCT as the basis, video compression formats take advantage of inter-frame redundancy in temporally-close video frames through motion compensation. In MPEG-based video compression, intra-coded frames (I-frames) are coded independently of other frames, and these independently-coded frames are similar to JPEG-compressed images for example. To remove the redundancy between frames, MPEG-based video compression employs forms of block-based motion compensation, where a video encoder takes a small block of image data in the frame being encoded and tries to find a close visual match in a reference frame. MPEG-based video compression thus provides predictive-coded frames (P-frames) that are predictively coded via motion compensation to one previous I or P frame, as well as bi-direction-ally-coded frames (B-frames) which encode a frame relative to both a previous I or P frame and a future I or P frame. As indicated, the frames 321 and 325 comprise I frames, the frames 322 and 324 comprise B frames, and the frame 323 comprises a P frame. It should be appreciated that the designation of anchor frames as I frames is illustrative and non-limiting, and that in some examples the anchor frames may comprise frames other than I frames.

A generative compression or frame synthesis framework takes two anchor frames, say a frame $gt_i$ and a frame $gt_k$, where the integer i is less than the integer k, and generate intermediate frames $gc_j$ based on the anchor frames, where the integer j is between the integers i and k. For example, the encoder includes only the first compressed frame 321 as a first anchor frame and the fifth compressed frame 325 as a second anchor frame, such that the first synthesized frame 331 of the plurality of synthesized frames 330 includes the first compressed frame 321 while the fifth synthesized frame 335 comprises the fifth compressed frame 325. The second synthesized frame 332 (e.g., frame $gc_2$), the third synthesized frame 333 (e.g., frame $gc_3$), and the fourth synthesized frame 334 (e.g., frame $gc_4$), are synthesized based on the frames 331 and 335. Thus, as indicated by the legend 380, the frames 331 and 335 comprise purely MPEG-encoded data from the ground truth frames 310, while the frames 332, 333, and 334 comprise receiver-generated data (e.g., frames synthesized at the decoder system 120). As described further herein with regard to FIG. 8, even the most accurate and advanced deep learning-based video frame interpolation methods capable of generating multiple frames (e.g., frames 332, 333, and 334) between two input frames (e.g., frames 331 and 335) may not produce sufficiently accurate synthesized frames when non-linear motion occurs between the input frames, especially with increased anchor-frame distance.

It should be appreciated that the frames 321, 331, and 341 comprise a same image frame (i.e., frame $gtm_1$), and similarly the frames 325, 335, and 345 comprise a same image frame (i.e., frame $gtm_5$). The difference between the intermediate frames disposed between the anchor frames among the different pluralities of image frames (e.g., 320, 330, and 340) is the composition of the intermediate frames as discussed herein.

It should be noted that the distance between the anchor frames 331 and 335 comprises the anchor-frame distance (AFD), which in the depicted example is four (e.g., the second anchor frame 335 is four frames away from the first anchor frame 331). The AFD may comprise a fixed distance (e.g., such that anchor frames are sampled at a fixed distance), or may vary dynamically according to an amount of motion (e.g., such that the distance between anchor frames increases or decreases as motion decreases below or increases above a threshold level) as described further herein. Further, the encoding of the anchor frames will be compressed using a video codec such as an MPEG-based or similar format.

For the hybrid compression approach described herein, anchor frames comprise a subset of ground truth frames 310 encoded into a sequence of MPEG frames. The anchor frames may be selected from a ground truth video sequence based on a selection criteria including, but not limited to, the AFD and/or measured motion between frames. As depicted, a plurality of hybrid compressed frames 340 includes two anchor frames including a first hybrid compressed frame 341 (e.g., the compressed frame $gtm_1$), and a fifth hybrid compressed frame 345 (e.g., the compressed frame $gtm_5$). That is, the first and fifth frames of the sequence of hybrid compressed frames 340 comprise anchor frames corresponding to the compressed frames 321 and 325. The plurality of hybrid compressed frames 340 further include hybrid compressed frames generated according to the hybrid method described herein, including a second hybrid compressed frame 342 (e.g., frame $hc_2$), a third hybrid compressed frame 343 (e.g., frame $hc_3$), and a fourth hybrid compressed frame 344 (e.g., frame $hc_4$). As depicted by legend 380, the hybrid compressed frames 342, 343, and 344 between the anchor frames 341 and 345 include both MPEG-encoded data as well as receiver-generated data. That is, rather than entirely synthesize the frames 342, 343, and 344 similarly to the synthesized frames 332, 333, and 334, the hybrid frames 342, 343, and 344 include a combination of MPEG-encoded residuals (e.g., blocks from the encoded frames 322, 323, and 324) and receiver-generated data (e.g., blocks from the synthesized frames 332, 333, and 334). The portions of the hybrid compressed frames 342, 343, and 344 comprising MPEG-encoded residuals correspond to areas in the video frames that the generative compression framework synthesizes or interpolates poorly. Further, in some examples, the resolution of the intermediate frames in the plurality of frames 340 may be smaller than the resolution of the intermediate frames in the plurality of frames 320 and 330, such that the intermediate DCT frames may have a smaller size than the original image.

FIG. 4 is a block diagram illustrating an example hybrid video compression architecture 400 according to an embodiment. The hybrid video compression architecture 400 may comprise the MLDVC module 224 stored in memory 220 of the computing device 205, for example. The hybrid video compression architecture 400 comprises a hybrid compression module 410 and a hybrid decompression module 450. The hybrid compression module 410 is configured to perform hybrid compression of anchor frames and intermediate frames, while the hybrid decompression module 450 is configured to perform hybrid decompression of hybrid compression frames as described further herein.

As depicted, the hybrid compression module 410 comprises an anchor frame compression module 411 and an intermediate frame compression module 412, while the hybrid decompression module 450 comprises an anchor frame decompression module 451 and an intermediate frame decompression module 452. The anchor frame compression module 411 of the hybrid compression module 410 comprises an encoder module 420 and a decoder module 425, while the intermediate frame compression module 412 of the hybrid compression module 410 comprises an image synthesizer 430 and a residual encoder module 440. The anchor frame decompression module 451 of the hybrid decompression module 450 comprises a decoder module 460, while the intermediate frame decompression module 452 of the hybrid decompression module 450 comprises an image synthesizer 470, a residual decoder module 480, and a post-processing module 490.

The hybrid compression module 410 receives two anchor frames as well as a ground truth frame between the two anchor frames selected from a video, and the hybrid compression module 410 outputs a hybrid compression frame corresponding to the ground truth frame.

To that end, as depicted, the hybrid compression module 410 receives two anchor frames including a first image or first anchor frame 402 (e.g., ground truth frame $gt_i$) and a second image or second anchor frame 404 (e.g., ground truth frame $gt_k$, where the difference between the integer k and the integer i is the AFD). The encoder 420 of the hybrid compression module 410 encodes the anchor frames 402 and 404 via DCT-based compression, and thus outputs a first encoded anchor frame 422 and a second encoded anchor frame 424 corresponding respectively to the first anchor frame 402 and the second anchor frame 404. The encoded anchor frames 422 and 424 are output from the hybrid compression module 410 as depicted. Further, the encoded anchor frames 422 and 424 may be decoded by decoder 425 of the anchor frame compression module 411, which in turn outputs decoded anchor frames 426 and 428 which respectively correspond to the ground truth anchor frames 402 and 404 (e.g., frames $gt_i$ and $gt_k$ as depicted). The decoded frames 426 and 428 are output from the decoder 425 of the anchor frame compression module 411 to the intermediate frame compression module 412.

The hybrid compression module 410 further receives one or more ground truth images 406 between the anchor frames 402 and 404 (e.g., frame $gt_j$ where the integer j is between the integer i and the integer k). The anchor frames 426 and 428 (e.g., anchor frames $gt_i$ and $gt_k$) from the anchor frame compression module 411 are input to the image synthesizer 430 comprising a trained neural network (e.g., the neural network $Net_e$), though in other examples the image synthesizer 430 may comprise another machine learning model such as a GAN. The image synthesizer 430 synthesizes one or more frames 432 (e.g., synthesized frame(s) $gc_j$) between the two anchor frames 426 and 428. It should be appreciated that in some examples, decoder 425 may be omitted and the ground truth anchor frames 402 and 404 may be input to the intermediate frame compression module 412 instead of the respective decoded ground truth anchor frames 426 and 428.

The synthesized frame(s) 432 generated by the image synthesizer 430 are input to the residual encoder module 440. Further, the anchor frames 426 and 428 from the anchor frame compression module 411, corresponding respectively to the anchor frames 402 and 404, as well as the ground truth frame(s) 406 corresponding to the synthesized frame(s) 432 are input to the residual encoder module 440. The residual encoder module 440 thus takes the synthesized image(s) 432, the anchor frames 426 and 428, and the ground truth image(s) 406, and determines what, if anything, to include in the compressed bitstream. For example, the residual encoder 440 may calculate the residual error (e.g., $error_j$) between the synthesized image(s) 432 and the corresponding ground truth image(s) 406. Further, the residual encoder module 440 encodes the residual error $error_j$ into an encoded residual error 442 (e.g., $errorm_j$). As an illustrative example, the residual encoder module 440 may break each synthesized image 432 and each corresponding ground truth image 406 into a plurality of macroblock squares, and each macroblock within each synthesized image 432 may be compared with the corresponding ground truth image 406 macroblock. The decision between whether to include the macroblock in encoding may comprise a suitable metric. In one example, as described further herein, the peak signal-to-noise ratio (PSNR) may be used as the metric for comparing macroblocks. Each macroblock above a PSNR threshold compared to the ground truth macroblock will not need a correction macroblock to be encoded. In other words, synthesized macroblocks with a PSNR above the PSNR threshold may be considered sufficient without additional correction. Thus, the residual encoder module 440 calculates the PSNR for each macroblock of the synthesized image(s) 432 compared to the ground truth image(s) 406, calculates the residual error for each macroblock with a PNSR below the PSNR threshold, and encodes the residual errors. The encoded residual error(s) 442 output by the residual encoder module 440 thus comprise residual error(s) for macroblocks in each synthesized image 432 with an image quality metric below a threshold.

The compression module 410 outputs an encoded bitstream comprising the encoded residual error 442 (e.g., $errorm_j$) and the encoded anchor frames 422 and 424 (e.g., the frames $gtm_i$ and $gtm_k$). The encoded bitstream may include the encoded anchor frames 422 and 424 as well as the encoded residual error 442 arranged or intermixed in sequence according to the correct order. The final encoded bitstream of the video is thus saved for later transmission and/or transmitted to the hybrid decompression module 450.

The hybrid decompression module 450 receives the encoded bitstream including the encoded anchor frames 422 and 424 as well as the encoded residual error(s) 442 (e.g., $errorm_j$).

The anchor frame decompression module 451 of the hybrid decompression module 450 decodes the encoded anchor frames 422 and 424 of the encoded bitstream while the intermediate frame decompression module 452 of the hybrid decompression module 450 decodes the encoded residual error(s) 442 of the encoded bitstream. To that end, a decoder 460 of the anchor frame decompression module 451 decodes the encoded anchor frames 422 and 424 and outputs the decoded anchor frames 462 and 464 (e.g., decoded anchor frames $gt_i$ and $gt_k$) corresponding respectively to the original input anchor frames 402 and 404. The decoder 460 may comprise a DCT-based decoder and may furthermore be identical to the decoder 425 of the anchor frame compression module 411. The decoded anchor frames 462 and 464 are output from the hybrid decompression module 450 as depicted for display, and furthermore are output from the anchor frame decompression module 451 to the intermediate frame decompression module 452 for enabling the hybrid decompression of the intermediate frames as described further herein.

The residual decoder module 480 of the intermediate frame decompression module 452 decompresses or decodes the received encoded residual error 442 and outputs the (decoded) residual error 482 (e.g., $error_j$). As depicted, the decoded anchor frames 462 and 464 decoded by the anchor frame decompression module 451 are input to the image synthesizer 470 of the hybrid decompression module 450 to generate or synthesize one or more synthesized frame(s) 472 (e.g., frame(s) $gc_j$). The image synthesizer 470 may comprise a machine learning model, such as a trained neural network, identical to the image synthesizer 430, such that the synthesized frame(s) 472 are identical to the synthesized frame(s) 432. The decoded residual error(s) 482 are applied to the synthesized image(s) 472 at the summing junction 485, resulting in the intermediate image frame(s) 486 (e.g., hybrid compression frames $hc_j$) corresponding to the intermediate ground truth frame(s) 406. Further, the intermediate image frame(s) 486 comprising the summed decoded residual error(s) 482 and synthesized image(s) 472 may be post-processed via a post-processing module 490 to create the intermediate image frame(s) 492.

Thus, the hybrid decompression module 450 outputs the decoded anchor frames 462 and 464 corresponding to the original input anchor frames 402 and 404, as well as the intermediate image frame(s) 492 corresponding to the inter-mediate ground truth image frames 406. The frames 462, 464, and 492 may be arranged or intermixed in sequence according to the correct order, for example, corresponding to the original order of the corresponding ground truth frames 402, 404, and 406. The intermediate frame(s) 492 may thus be arranged between the decoded anchor frames 462 and 464, for example. Thus, a video comprising the ground truth frames 402, 404, and 406 may be compressed according to a hybrid compression as described herein into an encoded bitstream comprising only the encoded anchor frames 422 and 424 as well as an encoded residual error 442, thereby significantly reducing the bandwidth depending on the residual error. The hybrid decompression of the encoded bitstream results in a video including the frames 462, 464, and 492 that corresponds to the original input video.

Figure 5:
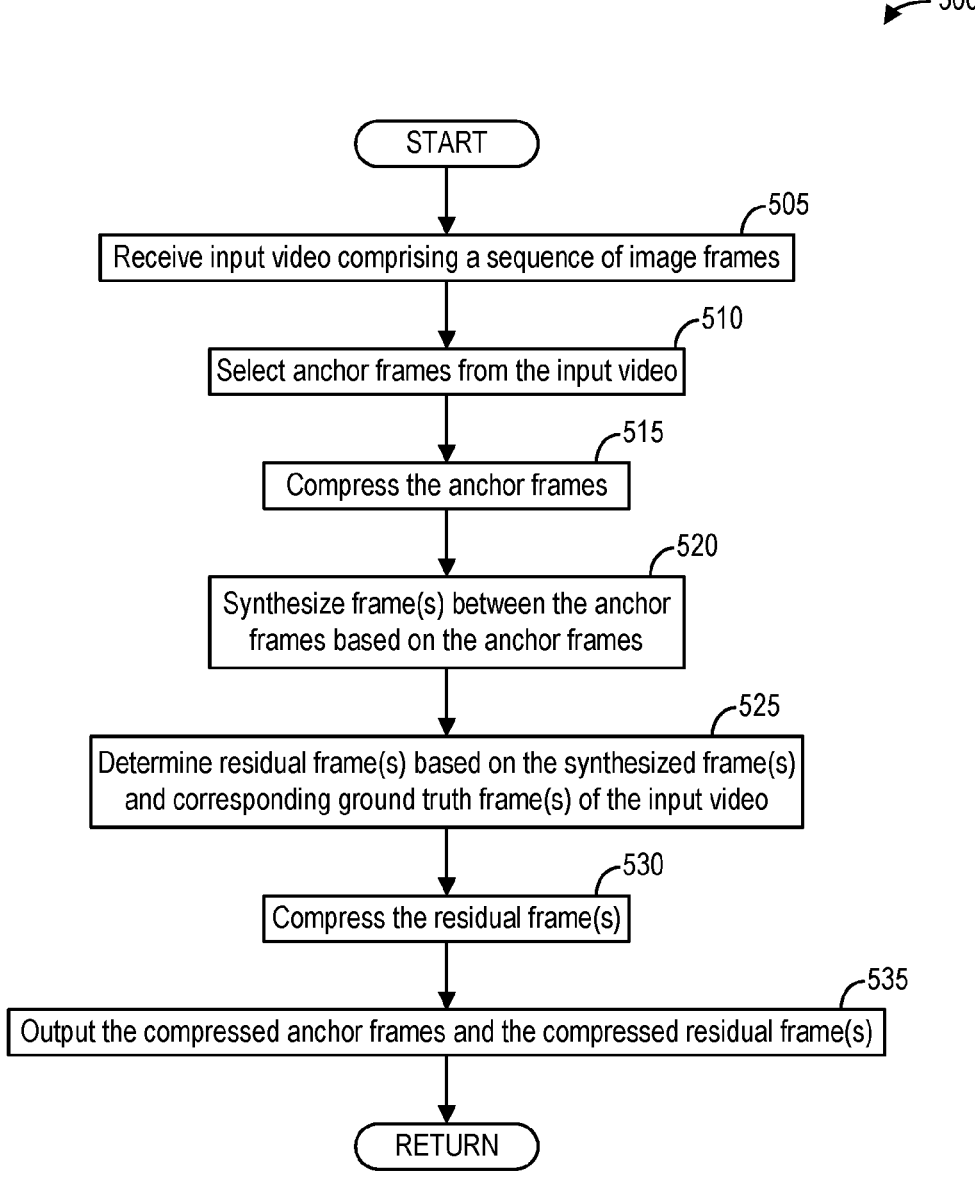
FIG. 5 is a high-level flow chart illustrating an example method for hybrid encoding of video according to an embodiment.

FIG. 5 is a high-level flow chart illustrating an example method 500 for hybrid encoding of video according to an embodiment. In particular, method 500 relates to encoding a video for storage and/or transmission, for example by encoding system 110, according to a machine learning and DCT-based video compression technique. Method 500 is described with regard to the systems and components of FIGS. 1-4, though it should be appreciated that the method 500 may be implemented with other systems and compo-nents without departing from the scope of the present disclosure. Method 500 may be implemented as computer executable instructions 222 stored in non-transitory memory 220 of a computing device 205, for example, and may be executed by a processor 210 of the computing device 205 to perform the actions described herein below.

Method 500 begins at 505. At 505, method 500 receives an input video comprising a sequence of image frames. The input video may be acquired in real-time, for example via an image source 240, or may be retrieved from storage, such as memory 220, or obtained via a hybrid method. At 510, method 500 selects anchor frames from the input video. The anchor frames may be selected based on a predetermined anchor-frame distance. Additionally or alternatively, the anchor frames may be selected from the input video based on other selection criteria, including, but not limited to, estimated motion between image frames, whether there is a scene change, how well the frames in between the anchor frames may be interpolated or synthesized, and so on. The anchor frames thus comprise a subset of the input video.

At 515, method 500 compresses the anchor frames. For example, method 500 may compress or encode the anchor frames into MPEG frames. As particular examples, method 500 may compress the anchor frames using video compres-sion techniques such as H.264/MPEG-4 or high efficiency video coding (HEVC). In order to maximize the quality of the frames and to ensure a consistent quality of the anchor frame encodings, the anchor frames may be encoded as a set of I-frames through MPEG, for example, with a fixed quantization value.

At 520, method 500 synthesizes one or more frame(s) between the anchor frames based on the anchor frames. For example, method 500 synthesizes at least one frame between two anchor frames by inputting the two anchor frames into a machine learning model, such as a deep neural network or GAN, configured to interpolate video frames. The number of frames synthesized depends on the AFD used to select anchor frames. To achieve improved accuracy during decompression, method 500 first decompresses the encoded anchor frames generated at 515 to recreate the decompressed anchor frames that will be obtained downstream during decompression, and uses the decompressed anchor frames recovered from the encoded stream to synthesize the one or more frame(s). In other examples, method 500 synthesizes the one or more intermediate frames between the anchor frames based on the original ground truth anchor frames selected from the input video at 510.

At 525, method 500 determines one or more residual frame(s) based on the synthesized frame(s) and the corre-sponding ground truth frame(s) of the input video. For example, method 500 breaks each synthesized frame into a plurality of macroblocks and each corresponding ground truth frame into a plurality of ground truth macroblocks. Method 500 then evaluates image quality of each synthe-sized macroblock relative to the ground truth macroblocks. For each synthesized macroblock that does not meet an image quality threshold, method 500 may calculate a residual encoding for the macroblock such as a motion-compensated residual representation. Alternatively, method 500 may select the ground truth macroblock for the residual frame. Thus, each residual frame for a given synthesized frame may include macroblocks comprising either a residual macroblock or a ground truth macroblock, with remaining macroblocks of the frame left empty. At 530, method 500 compresses the residual frame(s). Method 500 compresses the residual frame(s) using the same video compression technique used at 515 to compress the anchor frames. However, the macroblocks of the residual frame(s) may be processed as B-frame macroblocks in MPEG, performing motion compensation to the anchor frames that surround it.

At 535, method 500 outputs the compressed anchor frames and the compressed residual frame(s). Method 500 may output the compressed anchor frames and residual frame(s) as an ordered sequence to storage, such as memory 220, such that the compressed video sequence comprising the compressed anchor frames and compressed residual frame(s) may be transmitted and/or decoded later. Addition-ally or alternatively, method 500 may output the compressed video sequence to a decoding system 120. Method 500 then returns.

Figure 6:
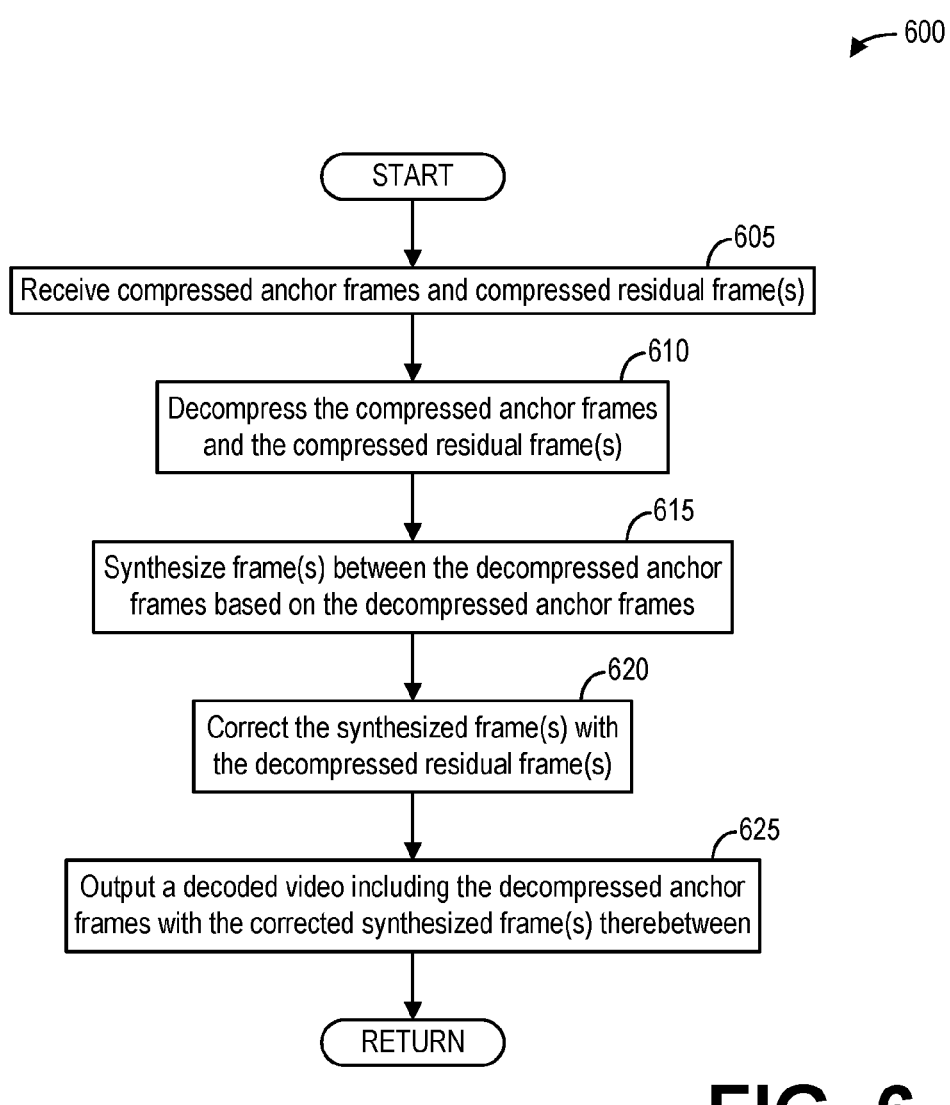
FIG. 6 is a high-level flow chart illustrating an example method for hybrid decoding of video according to an embodiment.

FIG. 6 is a high-level flow chart illustrating an example method 600 for hybrid decoding of video according to an embodiment. In particular, method 600 relates to hybrid decoding of a hybrid-encoded video encoded, for example, by encoding system 110, according to a machine learning and DCT-based video compression technique. Method 600 is described with regard to the systems, components, and methods of FIGS. 1-5, though it should be appreciated that the method 600 may be implemented with other systems and components without departing from the scope of the present disclosure. Method 600 may be implemented as computer-executable instructions 222 stored in non-transitory memory 220 of a computing device 205, for example, and may be executed by a processor 210 of the computing device 205 to perform the actions described herein below.

Method 600 begins at 605. At 605, method 600 receives the compressed video comprising the compressed anchor frames and compressed residual frame(s) generated as described hereinabove with regard to FIG. 5. At 610, method 600 decompresses the compressed anchor frames and the compressed residual frame(s). Method 600 uses a decom-pression technique corresponding to the compression technique used to compress the anchor frames and the residual frame(s). In this way, the methods 500 and 600 may be implemented with any suitable video coding standard.

At 615, method 600 synthesizes one or more frame(s) between the decompressed anchor frames based on the decompressed anchor frames. Method 600 synthesizes the one or more frame(s) between the decompressed anchor frames by inputting the decompressed anchor frames into a deep machine learning model configured to synthesize or interpolate the one or more frame(s). Method 600 uses a deep machine learning model identical to the deep machine learning model used at 520 to synthesize frame(s). The number of frames synthesized depends on the AFD used to select anchor frames.

Continuing at 620, method 600 corrects the synthesized frame(s) with the decompressed residual frame(s). For example, method 600 adds the macroblock(s) of the decompressed residual frame(s) to the corresponding macroblock(s) of the synthesized frame(s). Alternatively, method 600 may replace empty macroblock(s) or skipped macroblock(s) of the residual frame(s) with the corresponding macroblock(s) of the synthesized frame(s). In either case, the resulting corrected synthesized frame(s) may comprise a combination of synthesized macroblocks and residual macroblocks.

At 625, method 600 outputs a decoded video including the decompressed anchor frames with the corrected synthesized frame(s) therebetween. Method 600 may output the decoded video, for example, to storage such as memory 220 for later retrieval, or to a display device 230 for display. Method 600 then returns.

Figure 7:
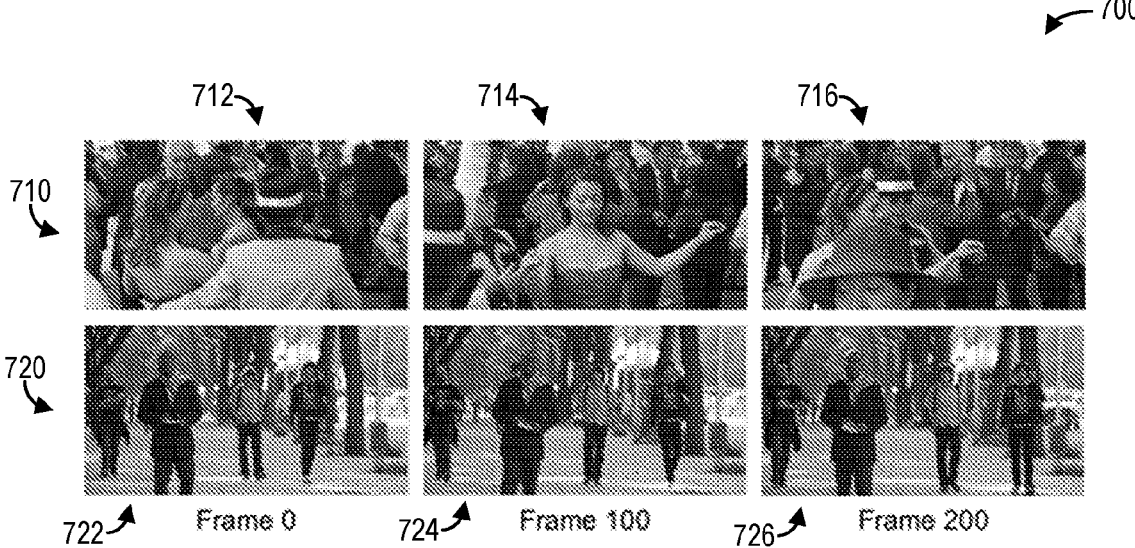
FIG. 7 is a set of images illustrating example image frames of a first video sequence and a second video sequence with non-linear motion.

To illustrate the hybrid video compression method described hereinabove, FIGS. 7-14 depict example applications of the techniques provided herein. In particular, FIG. 7 is a set of images illustrating example image frames 700 of a first video sequence 710 with non-linear motion and a second video sequence 720 with relatively linear motion. The first video sequence 710 includes a plurality of image frames, including a first frame 712 (e.g., frame 0 of the sequence 710), a second frame 714 (e.g., frame 100 of the sequence 710), and a third frame 716 (e.g., frame 200 of the sequence 710). The first video sequence 710 depicts a scene of people dancing, and thus exhibits highly non-linear motion and occlusions from frame to frame. The second video sequence 820 also includes a plurality of image frames, including a first frame 722 (e.g., frame 0 of the sequence 720), a second frame 724 (e.g., frame 100 of the sequence 720), and a third frame 726 (e.g., frame 200 of the sequence 720). The image frames of the first video sequence 710 and the second video sequence 720 comprise ground truth frames as described hereinabove.

Figure 8:
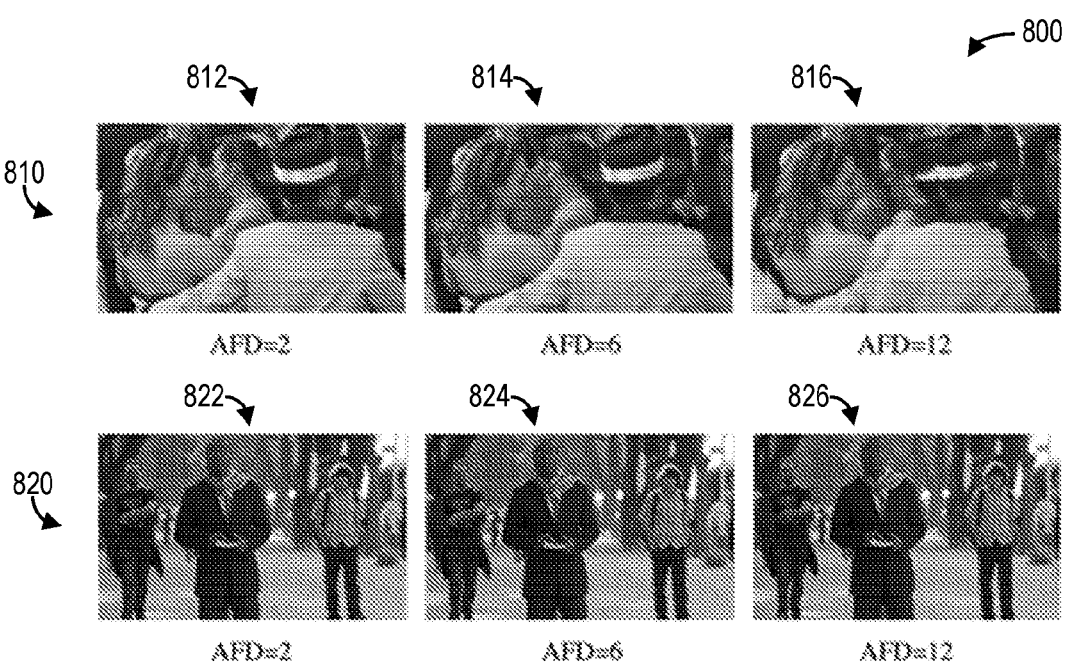
FIG. 8 is a set of images illustrating example image frames from the first and second video sequences synthesized with different anchor-frame distances without hybrid video compression.

FIG. 8 is a set of images illustrating example image frames 800 from the first video sequence 710 and the second video sequence 720 synthesized with different anchor-frame distances without hybrid video compression. In particular, the image frames 800 include a first set of synthesized frames 810 from the first video sequence 710 including a first synthesized frame 812 with an anchor-frame distance of two, a second synthesized frame 814 with an anchor-frame distance of six, and a third synthesized frame 816 with an anchor-frame distance of twelve. The first set of image frames 810 comprise a same image frame relative to the entire video sequence 710, but interpolated from anchor frames with increasing AFD. As depicted in the first synthesized frame 812, the generative compression technique that includes synthesizing or interpolating an image frame may be effective without the hybrid technique when the anchor frames are directly preceding and succeeding the synthesized frame. That is, with an AFD of two, every other frame is synthesized. However, when the AFD is increased to six, errors in the interpolation are visible, as noted by the face of the woman in the second synthesized frame 814. The face of the woman in the middle of the frame is almost entirely missing in the third synthesized frame 816, while the right side of the dancer in the right side of the frame is highly degraded.

Similarly, the second set of synthesized frames 820 from the second video sequence 720 includes a first synthesized frame 822 with an anchor-frame distance of two, a second synthesized frame 824 with an anchor-frame distance of six, and a third synthesized frame 826 with an anchor-frame distance of twelve. As the motion in the second video sequence 720 is less complex relative to the motion in the first video sequence 710, fewer visible interpolation errors are clearly visible for synthesized frames with a greater AFD, though the arm of the person in the left of the frame becomes slightly more degraded with increasing AFD.

Figure 9:
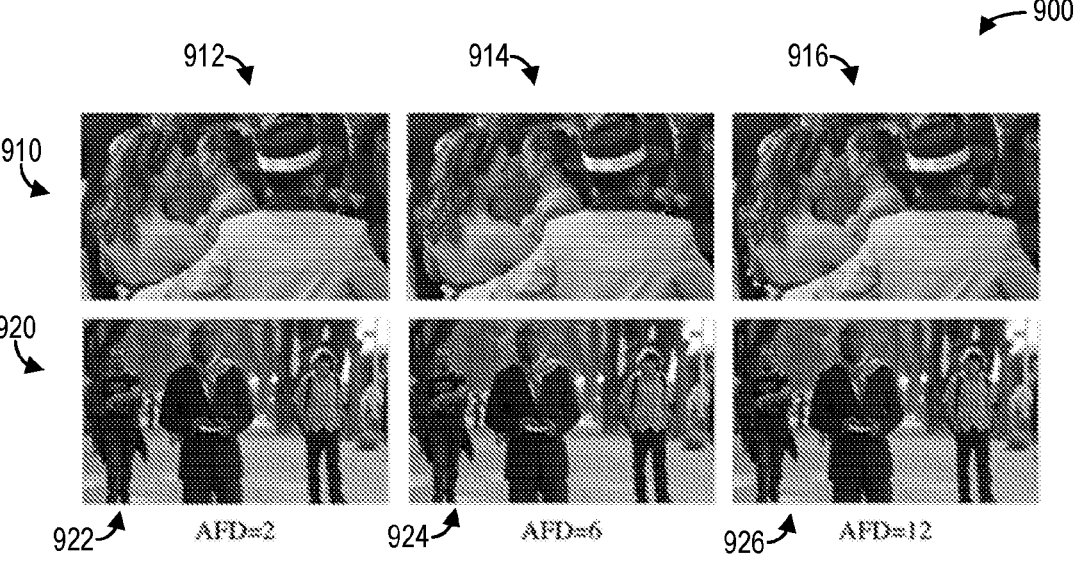
FIG. 9 is a set of images illustrating example image frames from the first and second video sequences synthesized with different anchor-frame distances with hybrid video compression according to an embodiment.

FIG. 9 is a set of images illustrating example image frames 900 from the first video sequence 710 and the second video sequence 720 synthesized with different anchor-frame distances with hybrid video compression as described herein. The image frames 900 correspond to the same image frame in the video sequences 710 and 720 that were synthesized in FIG. 8. The first set of synthesized frames 910 from the first video sequence 710 includes a first synthesized frame 912 with an anchor-frame distance of two, a second synthesized frame 914 with an anchor-frame distance of six, and a third synthesized frame 916 with an anchor-frame distance of twelve. Similarly, the second set of synthesized frames 920 from the second video sequence 720 includes a first synthesized frame 922 with an anchor-frame distance of two, a second synthesized frame 924 with an anchor-frame distance of six, and a third synthesized frame 926 with an anchor-frame distance of twelve. Similar to the non-hybrid synthesis approach, interpolating every other frame is relatively effective regardless of the amount of complex motion, as depicted by the synthesized frames 912 and 922. However, in contrast with FIG. 8, the synthesized frames at higher AFDs exhibit fewer interpolation errors. For example, the face of the woman in the middle of the frame in the first set of synthesized frames 910 is interpolated without error even with an AFD of twelve, as depicted by the synthesized frame 916, while the swinging arm of the person in the right of the frame in the second set of synthesized frames 920 is depicted without interpolation errors even with an AFD of twelve, as depicted by the synthesized frame 926.

It should be appreciated that, for a frame rate of 24 frames per second, an AFD of twelve indicates that only two anchor frames per second are used, while an AFD of two indicates that only twelve anchor frames per second are used. Thus, fewer frames may be included in an encoded bitstream with increasing AFD.

Further, the video quality threshold used to evaluate the synthesized frames determines how many macroblocks are encoded as residuals in the encoded bitstream. For example, FIG. 10 is a set of images 1000 illustrating the effect of different peak signal-to-noise ratio (PSNR) thresholds on detecting macroblocks in the first video sequence 710 for replacement according to an embodiment. In particular, the set of images 1000 depicts example residual frames for a same image frame in the first video sequence, determined with different PSNR thresholds. The black areas represent macroblocks that meet the PSNR threshold and are thus not encoded into the bitstream, while portions of the image frame that are not black correspond to macroblocks that are encoded into the bitstream. The first image frame 1010 is obtained with a PSNR threshold of 30 dB, the second image frame 1020 with a PSNR threshold of 36 dB, the third image frame 1030 with a PSNR threshold of 42 dB, and the fourth image frame 1040 with a PSNR threshold of 48 dB. As depicted, a lower PSNR threshold results in a larger number of macroblocks meeting the PSNR threshold and thus not being included in the residual frame, while a higher PSNR threshold results in a larger number of macroblocks being included in the residual frame. For the first image frame 1010 with the PSNR threshold of 30 dB, most of the areas that are not encoded are either fairly flat in color (e.g., the back of the dancer's jacket) or reasonably easy to interpolate (e.g., the dancer on the left has motion that is fairly linear at this point in the video sequence 710 and thus is relatively easier to synthesize). As the threshold value is increased, more and more macroblocks are added to the residual frames. As depicted in the fourth image frame 1040, for a PSNR threshold of 48 dB, nearly the entire frame is encoded.

In comparison, FIG. 11 is a set of images 1100 illustrating the effect of different PSNR thresholds on detecting macroblocks in the second video sequence 720 for replacement according to an embodiment. Similar to the set of images 1000 depicted in FIG. 10, the set of images 1100 includes a first image frame 1110 obtained with a PSNR threshold of 30 dB, a second image frame 1120 with a PSNR threshold of 36 dB, a third image frame 1130 with a PSNR threshold of 42 dB, and a fourth image frame 1140 with a PSNR threshold of 48 dB. As depicted by the first image frame 1110, almost the entire frame does not need to be encoded due to the motion in the second video sequence 720 being relatively slow. Meanwhile, as depicted by the fourth image frame 1140, at the PSNR threshold of 48 dB, a significant portion of the frame is encoded simply because the MPEG sequence generates frames in the 45-48 dB range. Of particular note through all of the image frames 1100 is the fact that the person at the middle of the frame is wearing a plaid shirt, which causes significant issues with PSNR if the interpolated image is off even by one pixel. The MLDVC technique adds macroblocks back in to fix errors that the generative compression algorithm introduces, and with a high enough PSNR threshold, the sequence will degenerate to simply being an MPEG-encoded stream with no areas being synthesized on the decoder side.

To illustrate the effect of increasing AFD quantitatively rather than qualitatively, FIG. 12 is a set of graphs 1200 illustrating the effect of different anchor-frame distances on video quality and bitrate for the first video sequence 710, while FIG. 13 is a set of graphs 1300 illustrating the effect of different anchor-frame distances on video quality and bitrate for the second video sequence 720. For the first video sequence 710, the first graph 1210 illustrates the effect of anchor-frame distance on video quality as measured by PSNR. Similarly, the second graph 1220 illustrates the effect of anchor-frame distance on video quality as measured by another video quality assessment metric, the video multi-method assessment fusion (VMAF) algorithm, for the first video sequence 710. The first graph 1210 and the second graph 1220 depict plots for the MLDVC method with a PSNR of 30 (MLDVC30), the MLDVC method with a PSNR of 36 (MLDVC36), the MLDVC method with a PSNR of 42 (MLDVC42), the MLDVC method with a PSNR of 48 (MLDVC48), a standard MPEG method, and a generative compression method (GC) comprising the synthesis/interpolation of frames in between anchor frames but without selective residual correction as provided by MLDVC. As depicted, the MPEG sequences achieve the highest quality assessment for both PSNR and VMAF metrics, which is expected as the MPEG sequences explicitly encode all of the data. Meanwhile, generative compression or machine learning-based synthesis alone suffers significant quality degradation on both metrics as the AFD increases. For the MLDVC30, MLDVC36, MLDVC42, and MLDVC48 sequences, increasing the quality threshold improves the overall PSNR values. Further, other than MLDVC30, the VMAF scores are relatively high and close to the MPEG sequence performance across all AFDs. These results underscore the fact that for some of the generative compression or synthesis, having a result that may be off by a pixel or two does not strongly impact the VMAF metric as long as it appears visually correct. As the first video sequence 710 includes substantial motion with hidden areas and significant non-linear motion with rotating dancers, a large AFD puts significant pressure on the machine learning framework to understand the motion itself. The hybrid approach provided herein alleviates this pressure on the machine learning framework, as reflected by the significant improvement of video quality from GC to MLDVC42, for example, with an increase from 29.40 dB to 42.88 dB under PSNR and from 59.49% to 94.96% under VMAF.

Similarly, the first graph 1310 of FIG. 13 illustrates the effect of anchor-frame distance on video quality as measured by PSNR in the second video sequence 720, while the second graph 1320 illustrates the effect of anchor-frame distance on video quality as measured by VMAF in the second video sequence 720. In general, the second image sequence 720 is easier to encode than the first video sequence 710, as the narrator in the second video sequence 720 is walking very slowly toward the camera that is moving backward slowly. Additionally, the background is more out-of-focus and blurred than the background in the first video sequence 710, thereby allowing more room for error. Due to the slower motion in the second video sequence 720, all algorithms achieve higher quality assessment scores, including the GC sequences. For the MPEG sequence, the PSNR is not significantly impacted by the larger AFD (I-frame to I-frame) spacing. Due to very few occlusions, MPEG is able to more successfully find higher quality matches during motion compensation. The difference between the PSNR and VMAF metrics becomes clearer with generative compression, as the PSNR value drops from 45.31 dB to 41.03 dB at an AFD of four, while under VMAF the drop-off is from 93.44% to 91.39%. As the motion is fairly slow, generative compression is relatively effective at interpolating the intermediate frames, as generative compression uses a linear interpolation approximation while the motion is slightly non-linear. While the actual visual difference is very small and not very perceptible, some of the edges are off by a pixel or two, resulting to a significant penalty under PSNR. Further, as the AFD increases, generative compression is able to do a better job of creating intermediate frames for the second video sequence 720 than the first video sequence 710. As the machine learning framework of the MLDVC technique is not limited to the models described herein, more accurate and improved machine learning frameworks may be implemented with the MLDVC technique to further improve the generative compression results overall, thereby further reducing the number of macroblocks to be encoded.

To quantitatively illustrate how the MLDVC technique described herein is advantageous over prior video compression methods, the third graph 1230 of FIG. 12 illustrates the effect of anchor-frame distance on the bitrate in the first video sequence 710, with plots corresponding to MLDVC30, MLDVC36, MLDVC42, MLDVC48, and MPEG encoding methods. Similarly, the third graph 1330 illustrates the effect of anchor-frame distance on the bitrate in the second video sequence 720. For the first video sequence 710, the MLDVC sequences provide a lower bitrate than the MPEG sequence, and thus a reduction in bandwidth, as AFD increases, though the difference shrinks as AFD becomes large. For smaller AFDs, there are bitrate savings due to the relatively easier ability to synthesize intermediate frames, while at larger AFDs, a significant amount of corrections need to be encoded, thereby wiping out the gains of generative compression. Due to the relatively easier motion in the second video sequence 720, there are more consistent bandwidth savings as depicted by the third graph 1330. For an AFD of four, MLDVC36 reduces the bitrate approximately 34.0% and 10.6% compared with MPEG-only compression for the first and second video sequences 710 and 720, respectively, as depicted by the respective graphs 1230 and 1330. For an AFD of six, MLDVC36 provides bandwidth savings of approximately 11.4% and 6.5% for the first and second video sequences 710 and 720, respectively.

To illustrate the amount of residual macroblocks to be encoded to correct generative compression errors, FIG. 14 is a set of graphs 1400 illustrating the effect of different anchor-frame distances on the number of macroblock changes in the first and second video sequences 710 and 720. In particular, the first graph 1410 depicts the number of macroblock changes as a function of AFD for the first video sequence 710, while the second graph 1420 depicts the number of macroblock changes as a function of AFD for the second video sequence 720, for the MLDVC method with different PSNR thresholds. As depicted, the number of changed macroblocks is positively correlated to the AFD, and the number of changed macroblocks increases as well with increasing PSNR thresholds. Since the synthesized images using a large AFD result in lower video quality, the MLDVC approach needs to substitute more macroblocks in the synthesized frames. The average percentage number of changed macroblocks for MLDVC36 with an AFD of four is 20.54% and 6.61% for the first video sequence 710 and the second video sequence 720, respectively, as depicted by the respective graphs 1410 and 1420. For MLDVC36 at large AFDs (e.g., an AFD of 12), 61.22% and 19.21% of the macroblocks need to be encoded in the first and second video sequences 710 and 720, respectively, as depicted by the respective graphs 1410 and 1420. At the PSNR threshold of 48, over 80% of all macroblocks are encoded across all AFDs. This is primarily due to the fact that the MPEG compression algorithm as implemented to generate the data yields MPEG frames of approximately 48 percent, and so most of the frame needs correction.

As mentioned hereinabove, the MLDVC technique described herein may be used with any suitable machine learning model configured to synthesize or interpolate, given two anchor frames, one or more intermediate frames between the two anchor frames. As an illustrative and non-limiting example, FIG. 15 is a block diagram illustrating an example multi-scale video frame synthesis neural network 1500 according to an embodiment. FIGS. 16A and B show magnified versions of the images from FIG. 15. In general, the deep neural network 1500 synthesizes high-quality image frames from two temporally-distant image frames, or anchor frames, 1502 and 1504. In particular, the deep neural network 1500 first estimates optical flows for two temporally-distant input images 1502 and 1504, gradually increases their resolutions and improves their quality, and then fuses image information at multi-scales to generate the final frame 1506.

The deep neural network 1500 is fully convolutional so that the network 1500 may process videos of any size. Further, the deep neural network 1500 includes three primary components: a multi-scale optical flow estimation network (depicted as the optical flow estimator 1510 and the optical flow estimator 1512), a pyramid image feature generation network (depicted as the feature pyramid extractor 1520 and the feature pyramid extractor 1530), and a multi-scale frame synthesis network 1560.

As depicted, the multi-scale optical flow estimator comprising the optical flow estimator 1510 and the optical flow estimator 1512 is used to calculate the bidirectional optical flows, namely optical flows 1516 and 1518, between the input frames 1502 and 1504. Then, a feature pyramid generator network is used to build an image feature pyramid for each of the input frames. The feature pyramid extractors 1520 and 1530, for example, may be implemented as convolutional neural networks constructed similar to a VGG network for image classification. As depicted, the feature pyramid extractor 1520, with the first input frame 1502 as input, generates a first feature map 1522, a second feature map 1524, and a third feature map 1526 at a first scale, a second scale, and a third scale, respectively. Similarly, the feature pyramid extractor 1530, with the second input frame 1504 as input, generates a first feature map 1532, a second feature map 1534, and a third feature map 1536 at a first scale, a second scale, and a third scale, respectively. The input frame 1502 and the corresponding feature maps 1522, 1524, and 1526, are then forward warped 1540 to a temporal location t according to the optical flow 1516. Similarly, the input frame 1504 and the corresponding feature maps 1532, 1534, and 1536 are forward warped 1550 to the temporal location t according to the optical flow 1518. The first forward-warped input frame 1541 and the corresponding forward-warped feature maps 1542, 1544, and 1546 are input to the frame synthesis network 1560. Further, the second forward-warped input frame 1551 and the corresponding forward-warped feature maps 1552, 1554, and 1556 are also input to the frame synthesis network 1560. The frame synthesis network takes all of these pre-warped frames and feature maps as input and generates the final interpolated frame 1506 at the time or temporal location t in between the times or temporal locations of the first and second input frames 1502 and 1504. By accepting and fusing image information at multiple scales, the frame synthesis network 1560 is configured to handle large motion and occlusion. To that end, the frame synthesis network 1560 may be implemented with a Grid-Net architecture, in some examples.

One possible limitation of the deep neural network 1500 is the reliance on optical flows for video frame synthesis without considering the underlying geometry of the scene. As a result, the deep neural network 1500 is prevented from synthesizing frames between substantially-distant input frames. One approach to improving the deep neural network 1500 in this way may therefore include incorporating an understanding of the scene geometry into the multi-scale frame synthesis network. In particular, a deep neural network may be configured to recover the depth map from a single input image. Such a network may be extended to take two frames as input, such as the anchor frames 1502 and 1504, and leverage both available stereo correspondence information and monocular depth cues to estimate a fullframe depth map. Once the depth maps of the input anchor frames are obtained, the depth maps may be used to guide the synthesis of the frames in between them by extending the multi-scale frame synthesis networks in two aspects. First, the depth information may be used to disambiguate the scenarios where pixels in both anchor frames are warped to the same location in the target frame. In occluded areas, such an ambiguity may occur when the background and foreground pixels are mapped to the same location. Depth information can be used to effectively remove this ambiguity and thereby avoid ghosting artifacts in the synthesis results. Second, the multi-scale frame synthesis network may be extended such that it warps the depth maps to the target temporal location t, and feeds the warped depth maps together with the warped anchor frames and feature maps to the frame synthesis network. The frame synthesis network outputs both the interpolated frame 1506 and a corresponding depth map. The frame synthesis network may thus be trained on both ground truth intermediate frames and a corresponding ground truth depth map. Configuring the network as a multi-task network and training the network to perform these two related tasks in turn helps the network to better learn to synthesize video frames, and learning the depth prediction helps the network to synthesize the interpolated frame in a way that respects the underlying geometry.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as computing device 205 described in reference to FIG. 2.

An embodiment provides a method for video compression including: receiving an encoded video comprising at least two compressed frames corresponding to at least two anchor frames and a compressed subset of at least one intermediate frame between the at least two anchor frames, generating, by inputting the at least two anchor frames into a deep machine learning model, a synthesized image frame corresponding to the at least one intermediate frame between the at least two anchor frames, reconstructing at least one hybrid image frame by combining the compressed subset of the at least one intermediate frame with the synthesized image frame, and outputting a video comprising the at least two anchor frames and the at least one hybrid image frame. In a first example of the method, the method further includes: decompressing the at least two compressed anchor frames into the at least two anchor frames, and decompressing the compressed subset into a decompressed subset, and reconstructing the at least one hybrid image frame by combining the decompressed subset with the synthesized image frame. In a second example of the method, optionally including the first example, the at least one intermediate frame includes two or more intermediate frames, wherein generating the synthesized image frame comprises generating two or more synthesized image frames corresponding to the two or more intermediate frames. In a third example of the method, optionally including one or both of the first and second examples, an encoding module generates the compressed subset of the at least one intermediate frame by synthesizing, with a second deep machine learning model of the encoding module identical to the deep machine learning model, at least one initial synthesized image frame, and selecting the compressed subset of the at least one intermediate frame based on the at least one initial synthesized image frame. In a fourth example of the method, optionally including one or more or each of the first through third examples, the encoding module selects the compressed subset of the at least one intermediate frame based on an image quality metric of at least one macroblock of the at least one initial synthesized image frame below an image quality metric threshold. In a fifth example of the method, optionally including one or more or each of the first through fourth examples, the method further includes: decompressing the at least two compressed anchor frames into at least two decompressed anchor frames, wherein inputting the at least two anchor frames into the deep machine learning model to generate the synthesized image frame comprises inputting the at least two decompressed anchor frames into the deep machine learning model to generate the synthesized image frame. In a sixth example of the method, optionally including one or more or each of the first through fifth examples, the method further includes: receiving the encoded video from one of a local storage device or a computing system via a network, and outputting the video to a display device.

Another embodiment provides a method of video compression comprising: compressing two anchor frames in a video, generating, by inputting the two anchor frames into a deep machine learning model, at least one intermediate frame between the two anchor frames, compressing a subset of the at least one intermediate frame, and combining the two compressed anchor frames and the compressed subset of the at least one intermediate frame into a compressed video. In a first example of the method, the method further comprises: transmitting the compressed video to a decoding system. In a second example of the method, optionally including the first example, the decoding system is configured to: decompress the two compressed anchor frames into two decompressed anchor frames and the compressed subset into a decompressed subset, generate, by inputting the two decompressed anchor frames of the compressed video into a second deep machine learning model, at least one intermediate frame between the two decompressed anchor frames, and combine the at least one intermediate frame between the two decompressed anchor frames with the decompressed subset of the at least one intermediate frame to generate a hybrid intermediate frame. In a third example of the method, optionally including one or both of the first and second examples, the deep machine learning model comprises a video frame synthesis neural network. In a fourth example of the method, optionally including one or more or each of the first through third examples, an anchor-frame distance between the two anchor frames is greater than two, and wherein the at least one intermediate frame comprises at least two intermediate frames.

An additional embodiment provides a system for video compression, including: an encoding system configured to selectively encode a portion of a video, and a decoding system communicatively coupled to the encoding system and configured to, synthesize, with a deep machine learning model, a remainder of the video upon receiving the selectively encoded portion of the video from the encoding system, and selectively combine the synthesized remainder of the video with the portion of the video. In a first example of the system, the encoding system includes a first processor and a first non-transitory memory, the first non-transitory memory configured with executable instructions that when executed by the first processor cause the first processor to: compress two anchor frames in the video, generate, by inputting the two anchor frames into a second deep machine learning model identical to the deep machine learning model, at least one intermediate frame between the two anchor frames, compress a subset of the at least one intermediate frame, and combine the two compressed anchor frames and the compressed subset of the at least one intermediate frame into a compressed video, the compressed video comprising the selectively encoded portion of the video. In a second example of the system, optionally including the first example, the first non-transitory memory is further configured with executable instructions that when executed by the first processor cause the first processor to: select the subset of the at least one intermediate frame based on an image quality metric of at least one macroblock of the at least one intermediate image frame below an image quality metric threshold. In a third example of the system, optionally including one or both of the first and second examples, the image quality metric comprises a peak signal-to-noise ratio (PSNR) or a video multi-method assessment fusion (VMAF). In a fourth example of the system, optionally including one or more or each of the first through third examples, the decoding system comprises a second processor and a second non-transitory memory, the second non-transitory memory configured with executable instructions that when executed by the second processor cause the second processor to: decompress the at least two compressed anchor frames to obtain at least two decompressed anchor frames, decompress the compressed subset of the at least one intermediate frame to obtain a decompressed subset of the at least one intermediate frame, generate, by inputting the at least two decompressed anchor frames into the deep machine learning model, a synthesized image frame corresponding to the at least one intermediate frame between the at least two anchor frames, reconstruct a hybrid image frame by combining the decompressed subset of the at least one intermediate frame with the synthesized image frame, and output, to a display device, a video comprising the at least two decompressed anchor frames and the hybrid image frame. In a fifth example of the system, optionally including one or more or each of the first through fourth examples, an anchor-frame distance between the two anchor frames is greater than two, and wherein the at least one intermediate frame between the two anchor frames comprises at least two intermediate frames between the two anchor frames. In a sixth example of the system, optionally including one or more or each of the first through fifth examples, the deep machine learning model comprises a video frame synthesis neural network. In a seventh example of the system, optionally including one or more or each of the first through sixth examples, the encoding system performs MPEG encoding of the portion of the video.

Aspects of the present disclosure are described herein with reference to flowchart illustrations and/or block diagrams of methods, apparatus, and computer program products according to the embodiments disclosed herein. Insofar as such block diagrams, flowcharts, and/or examples contain one or more functions and/or operations, it will be understood by those of skill in the art that each function and/or operation within such block diagrams, flowcharts, or examples can be implemented, individually and/or collectively, by computer readable instructions using a wide range of hardware, software, firmware, or virtually any combination thereof. The described systems are exemplary in nature, and may include additional elements and/or omit elements. The subject matter of the present disclosure includes all novel and non-obvious combinations and sub-combinations of the various systems and configurations, and other features, functions, and/or properties disclosed. Thus, the methods may be performed by executing stored instructions on machine readable storage media with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A system, comprising:
a hybrid encoding system configured to selectively encode a portion of a video; and
a decoding system communicatively coupled to the hybrid encoding system and configured to, synthesize, with a deep machine learning model, a remainder of the video upon receiving the selectively encoded portion of the video from the hybrid encoding system, and selectively combine the synthesized remainder of the video with the portion of the video,
wherein the hybrid encoding system comprises a first processor and a first non-transitory memory, the first non-transitory memory configured with executable instructions that when executed by the first processor cause the first processor to:
compress two anchor frames in the video, wherein the two anchor frames include MPEG-encoded data from ground truth frames; and
generate, by inputting the two anchor frames into a second deep machine learning model identical to the deep machine learning model, at least one intermediate frame between the two anchor frames, wherein the at least one intermediate frame includes receiver-generated data.

2. The system of claim 1, wherein the first non-transitory memory is further configured with executable instructions that when executed by the first processor cause the first processor to:

compress a subset of the at least one intermediate frame; and combine the two compressed anchor frames and the compressed subset of the at least one intermediate frame into a compressed video, the compressed video comprising the selectively encoded portion of the video.

3. A system, comprising:

a hybrid encoding system configured to selectively encode a portion of a video; and a decoding system communicatively coupled to the hybrid encoding system and configured to, synthesize, with a deep machine learning model, a remainder of the video upon receiving the selectively encoded portion of the video from the hybrid encoding system, and selectively combine the synthesized remainder of the video with the portion of the video;

wherein the hybrid encoding system comprises a first processor and a first non-transitory memory, the first non-transitory memory configured with executable instructions that when executed by the first processor cause the first processor to:

compress two anchor frames in the video;

generate, by inputting the two anchor frames into a second deep machine learning model identical to the deep machine learning model, at least one intermediate frame between the two anchor frames;

compress a subset of the at least one intermediate frame;

select the subset of the at least one intermediate frame based on an image quality metric of at least one macroblock of the at least one intermediate image frame below an image quality metric threshold; and combine the two compressed anchor frames and the compressed subset of the at least one intermediate frame into a compressed video, the compressed video comprising the selectively encoded portion of the video.

4. The system of claim 3, wherein the image quality metric comprises a peak signal-to-noise ratio (PSNR) or a video multi-method assessment fusion (VMAF).

5. The system of claim 3, wherein the decoding system comprises a second processor and a second non-transitory memory, the second non-transitory memory configured with executable instructions that when executed by the second processor cause the second processor to:

decompress the at least two compressed anchor frames to obtain at least two decompressed anchor frames;

decompress the compressed subset of the at least one intermediate frame to obtain a decompressed subset of the at least one intermediate frame;

generate, by inputting the at least two decompressed anchor frames into the deep machine learning model, a synthesized image frame corresponding to the at least one intermediate frame between the at least two anchor frames;

reconstruct a hybrid image frame by combining the decompressed subset of the at least one intermediate frame with the synthesized image frame; and output, to a display device, a video comprising the at least two decompressed anchor frames and the hybrid image frame.

6. The system of claim 3, wherein an anchor-frame distance between the two anchor frames is greater than two, and wherein the at least one intermediate frame between the two anchor frames comprises at least two intermediate frames between the two anchor frames.

7. The system of claim 3, wherein the deep machine learning model comprises a video frame synthesis neural network.

8. The system of claim 1, wherein the hybrid encoding system performs the MPEG-based encoding of the two anchor frames by using H.264/MPEG-4 or high efficiency video coding (HEVC).

9. The system of claim 3, wherein the first non-transitory memory is further configured with executable instructions that when executed by the first processor cause the first processor to transmit the compressed video to a decoding system.

10. The system of claim 9, wherein the decoding system is configured to:

decompress the two compressed anchor frames into two decompressed anchor frames and the compressed subset into a decompressed subset;

generate, by inputting the two decompressed anchor frames of the compressed video into a second deep machine learning model, at least one intermediate frame between the two decompressed anchor frames; and combine the at least one intermediate frame between the two decompressed anchor frames with the decompressed subset of the at least one intermediate frame to generate a hybrid intermediate frame.

* * * * *